(12) United States Patent
Prewitt et al.

(10) Patent No.: US 6,536,691 B2
(45) Date of Patent: Mar. 25, 2003

(54) APPARATUS FOR AND METHOD OF SHREDDING A PRODUCT

(75) Inventors: William C. Prewitt, Berthoud, CO (US); David Hendrickson, Denver, CO (US); Chris Hildreth, Northglenn, CO (US); James G. Leprino, Indian Hills, CO (US)

(73) Assignee: Leprino Foods Company, Denver, CO (US)

( * ) Notice: Subject to any disclaimer, the term of this patent is extended or adjusted under 35 U.S.C. 154(b) by 0 days.

(21) Appl. No.: 09/790,515

(22) Filed: Feb. 23, 2001

(65) Prior Publication Data

US 2002/0170991 A1 Nov. 21, 2002

(51) Int. Cl.[7] .............................................. B02C 19/12
(52) U.S. Cl. ................... 241/86.1; 241/95; 241/101.01; 29/426.1
(58) Field of Search ................ 29/426.1, 428; 241/30, 95, 86.1, 88.1, 89.3, 89.1, 101.01, 242, 243

(56) References Cited

U.S. PATENT DOCUMENTS

| | | | |
|---|---|---|---|
| 1,114,411 A | * 10/1914 | Stuver ................... 241/101.01 |
| 1,569,561 A | * 1/1926 | Miller | |
| 1,847,000 A | 2/1932 | Englen | |
| 1,965,501 A | 7/1934 | Knott | |
| 2,004,548 A | 6/1935 | Abbott | |
| 2,195,879 A | 4/1940 | Urschel et al. | |
| 2,436,410 A | 2/1948 | Urschel et al. | |
| 2,465,670 A | 3/1949 | Urschel et al. | |
| 2,539,002 A | 1/1951 | Abbott | |
| 2,541,180 A | 2/1951 | Urschel et al. | |
| 2,545,720 A | 3/1951 | Abbott | |

(List continued on next page.)

OTHER PUBLICATIONS

Model RA–D Instruction Manual, Urschel Laboratories, Inc., Oct. 93.
Model CC Instruction Manual, Urschel Laboratories, Inc., Mar. 94.
Model CC–D Instruction Manual, Urschel Laboratories, Inc., Jun. 92.
Model RA, Model RA–A Instruction Manual, Urschel Laboratories, Inc., Mar. 97.
Model CC Instruction Manual Revisions, Urschel Laboratories, Inc., Jan. 20, 2000.
Model CC–D Instruction Manual Revisions, Urschel Laboratories, Inc., Jan. 12, 2000.

*Primary Examiner*—Mark Rosenbaum
(74) *Attorney, Agent, or Firm*—Fitzpatrick, Cella, Harper & Scinto

(57) ABSTRACT

An apparatus for shredding a product includes a housing having an interior space bounded by a generally cylindrical sidewall that can include one or more contoured segments. The housing further includes a cutting implement, preferably also contoured, following the contoured segment, with an opening in the sidewall between the contoured segment and the cutting implement that follows it. Preferably, the contours of the cutting implement are different from the contours of the segment that the cutting implement follows. The apparatus further includes a feed hopper through which a product to be shred is fed to the interior space of the housing, an impeller, including at least one impeller paddle, mounted for rotation within the housing about a substantially horizontal axis of rotation, and a driving mechanism coupled to the impeller for rotating the impeller. The product is slid along the inner periphery of the housing by the impeller, at such a speed that centrifugal force keeps the outer face of the product pressed against the inner periphery. As the product passes by a cutting implement, a plurality of shreds are cut from the outer face of the product and discharged from the housing.

40 Claims, 16 Drawing Sheets

U.S. PATENT DOCUMENTS

| | | | |
|---|---|---|---|
| 2,832,387 A | 4/1958 | Woodward, Jr. | |
| 2,859,784 A | 11/1958 | Woodward, Jr. et al. | |
| 2,884,974 A | 5/1959 | Woodward, Jr. | |
| 2,934,117 A | 4/1960 | Urschel et al. | |
| 2,938,558 A | * 5/1960 | Urschel | 241/86.1 |
| 2,961,024 A | 11/1960 | Urschel et al. | |
| 3,139,127 A | 6/1964 | Urschel et al. | |
| 3,139,128 A | 6/1964 | Urschel et al. | |
| 3,139,129 A | 6/1964 | Urschel et al. | |
| 3,139,130 A | 6/1964 | Urschel et al. | |
| 3,381,731 A | 5/1968 | Bath et al. | |
| 3,401,728 A | 9/1968 | Allen et al. | |
| 3,857,310 A | 12/1974 | Tiby | |
| 4,523,503 A | 6/1985 | Julian et al. | |
| 4,590,835 A | 5/1986 | Matsuo | |
| 4,601,227 A | 7/1986 | Fitzwater et al. | |
| D285,085 S | 8/1986 | Fischer et al. | |
| 4,604,925 A | 8/1986 | Wisdom | |
| 4,610,397 A | 9/1986 | Fischer et al. | |
| 4,625,606 A | 12/1986 | Pinegar et al. | |
| 4,648,296 A | 3/1987 | Wisdom et al. | |
| 4,657,190 A | 4/1987 | Fischer et al. | |
| 4,660,778 A | 4/1987 | Fischer et al. | |
| 4,813,317 A | 3/1989 | Urschel et al. | |
| 4,945,794 A | 8/1990 | Quo et al. | |
| 4,949,612 A | 8/1990 | Julian | |
| 5,050,809 A | * 9/1991 | Rupp | 222/129.1 |
| 5,095,875 A | 3/1992 | Morris et al. | |
| 5,129,299 A | 7/1992 | Fischer et al. | |
| 5,201,469 A | 4/1993 | Urschel | |
| 5,555,787 A | 9/1996 | Barber et al. | |
| 5,694,824 A | 12/1997 | Jacko et al. | |
| 5,819,628 A | 10/1998 | Cogan et al. | |
| 5,896,801 A | 4/1999 | Jacko | |

* cited by examiner

APPARATUS FOR AND METHOD OF SHREDDING A PRODUCT

BACKGROUND OF THE INVENTION

1. Field of the Invention

The present invention relates generally to an apparatus for and a method of shredding a product, and, in particular, to such an apparatus and method in which the product is shredded as it is moves around the inner periphery of a vertically-oriented housing.

2. Description of the Related Art

In the production of food products such as cheese, potatoes, fruits, vegetables, processed meats, and the like, it is often desired to cut the product into slices, strips, shreds, dices, or other forms. In the cheese industry especially, customers demand a wide variety of cuts. For example, some customers want slices, others want strips or shreds, while still others prefer dices. To serve a full range of customers, cheese producers must have the ability to meet these varying demands. One commercial machine designed for this purpose is described below with reference to FIGS. 1–3.

In FIG. 1, a known commercial machine, referred to as a "prior art vertical feed machine," or "PAVFM" for short, is designated generally by reference numeral 100. The PAVFM includes a frame 102, on which a stationary, generally cylindrical, vertically-oriented slicing case 104 is mounted. By "vertically-oriented" it is meant that the slicing case 104 is oriented such that its cylindrical axis is substantially horizontal. As seen in FIG. 2, the slicing case 104 has an open front face, a rear wall 106, and a sidewall 108 with a substantially smooth inner surface. A feed hopper 110, shown in FIG. 1, is aligned with the open front face of the slicing case 104 for delivering a product to be cut to the slicing case interior. The slicing case 104 has an internal diameter of approximately 12" and a depth (i.e., the width of the sidewall 108) of approximately 4¼". As shown in FIG. 2, knife holder 118 and a knife clamp 120 secure a straight-edge slicing knife 116 within the slicing case 104. The slicing case sidewall 108 includes an opening 112, and a portion of the sidewall 108 adjacent to the opening 112 and across from the slicing knife 116 forms an adjustable case gate 114. By turning an adjustment knob 122 of a slice adjustment assembly 124, the case gate 114 can be moved radially inward and outward to vary the width of the opening 112. Changing the width of the opening 112 varies slice thickness.

An impeller 126 is mounted within the slicing case 104 for rotation in a counterclockwise direction, indicated by arrow A in FIG. 3, about a substantially horizontal axis. The impeller 126 is bolted to a drive shaft 128 that extends through a central opening (not shown) in the rear wall 106 of the slicing case 104. As shown in FIG. 2, the impeller 126 comprises a disc-shaped base plate 128, a flat, ring-shaped plate 130, and four circumferentially-spaced paddles 132 that are fitted between the disc-shaped base plate 128 and the ring-shaped plate 130.

An auxiliary cutting assembly 134, shown in FIG. 3, is provided beneath the opening 112 in the slicing case 104. The auxiliary cutting assembly 134 includes a feed drum 136, a feed spindle 138, circular knives 140, shear plates 142, and crosscut knives 144. The feed drum 136 is mounted for rotation in a counterclockwise direction, indicated by arrow B, beneath a chute 146 leading from the opening 112 in the slicing case 104. The feed spindle 138 is mounted opposite the feed drum 136 for rotation in a clockwise direction, indicated by arrow C. After slices 170 are cut by the slicing knife 116 and discharged through the opening 112, the feed drum 136 and the feed spindle 138 together convey the slices 170 to the circular knives 140, which further cut the slices 170 into strips 180. The circular knives 140 rotate in a clockwise direction, indicated by arrow D. Shear plates 142 are interposed between the circular knives 140 for holding the strips 180 as they are cut into dices 190 by the crosscut knives 144, which rotate in a counterclockwise direction, indicated by arrow E. A discharge chute 148 directs the dices 190 to a conveyor (not shown) or the like.

The PAVFM typically is equipped with either a 5 or 7½ horsepower motor 150, shown in FIG. 1, for simultaneously driving rotation of both the impeller 126 and the moving parts of the auxiliary cutting assembly 134. However, the PAVFM can be modified by providing separate motors for independently driving the impeller 126 and the auxiliary cutting assembly 134. For example, a 15 horsepower motor can be used to drive the impeller 126, and a 10 horsepower motor can be used to drive the auxiliary cutting assembly 134. This particular two-motor configuration is referred to herein as a "modified PAVFM." Unless the context indicates otherwise, use of the term "PAVFM" hereafter encompasses both unmodified and modified PAVFMs.

The operation of the PAVFM next will be described primarily with reference to FIG. 3. Blocks of cheese 160, for example, are fed through the feed hopper 110 to the interior of the slicing case 104, where they are collected by the impeller paddles 132 for movement therewith around the inner periphery of the slicing case 104. Centrifugal force ensures that one face of each of the cheese blocks 160 remains in sliding contact with the inner periphery of the slicing case 104 throughout the entire revolution of the impeller 126. That face is referred to herein as the "outer face." As a cheese block 160 approaches the slicing knife 116, the case gate 114 allows the block 160 to move radially outward a preselected distance before the leading edge of the block 160 contacts the cutting edge of the slicing knife 116. A slice 170 is cut from the outer face of the cheese block 160 as the impeller paddle 132 pushes it past the slicing knife 116. The slice 170 slides down the chute 146 and onto the revolving feed drum 136, which, together with the feed spindle 138, conveys the slice 170 to the circular knives 140. The circular knives 140 then cut the slice 170 into strips 180, after which the rotating crosscut knives 144 further cut the strips 180 into dices 190.

In the mode of operation described above, the PAVFM produces a diced final product. The PAVFM can be adapted to produce strips or shreds by removing the crosscut knives 144, or it can be adapted to produce slices by removing the entire auxiliary cutting assembly 134. The PAVFM is capable of making products having a thickness between ⅟₁₆" and ⅜", a width between ⅛" and 1", and a length between ⅟₁₆" and 3". The size of the final product can be varied by adjusting the slice thickness, changing the spacing between circular knives 140, and/or changing the spacing between crosscut knives 144.

Tables 1–3 list production rate data for three different cuts of cheese typically made with the PAVFM—a standard shred, a standard dice, and a long thin shred. For each type of cut, the input product is a block of mozzarella cheese, ¾" thick by 2" wide by 2" long. The cheese is unfrozen and at a temperature of about 32–38° F. In each example, the impeller 126 is driven at approximately 450 RPM, the feed drum 136 and circular knives 140 are driven at approximately 900 RPM, and the feed spindle 138 and crosscut knives 144 are driven at approximately 2463 RPM. At impeller speeds greater than 450 RPM, the cheese tends to crumple or collapse as it passes through the cutting knives.

TABLE 1

PAVFM and modified PAVFM data for standard shreds.

| | |
|---|---|
| Shred Dimensions | ⅛" thick × ⅛" wide × ¾" long |
| PAVFM Max. Output (5 HP Motor) | ~1200 lbs/hr |
| PAVFM Max. Output (7½ HP Motor) | ~1800 lbs/hr |
| Modified PAVFM Max. Output | ~3400 lbs/hr |

TABLE 2

PAVFM and modified PAVFM data for standard dices.

| | |
|---|---|
| Dice Dimensions | ⅛" thick × ⅛" wide × ⅛" long |
| PAVFM Max. Output (5 HP Motor) | ~1200 lbs/hr |
| PAVFM Max. Output (7½ HP Motor) | ~1800 lbs/hr |
| Modified PAVFM Max. Output | ~3400 lbs/hr |

TABLE 3

PAVFM and modified PAVFM data for long thin shreds.

| | |
|---|---|
| Shred Dimensions | ¹⁄₁₆" thick × ⅛" wide × 1½" long |
| PAVFM Max. Output (5 HP Motor) | ~800–950 lbs/hr |
| PAVFM Max. Output (7½ HP Motor) | ~950–1000 lbs/hr |
| Modified PAVFM Max. Output | ~1800 lbs/hr |

As shown in Tables 1–3, the maximum output of the PAVFM for standard shreds and dices is limited to approximately 1800 pounds per hour, while for long thin shreds the maximum output is only about 950–1000 pounds for hour. The modified PAVFM performs significantly better, but still is limited to approximately 3400 pounds per hour for standard shreds and dices and about 1800 pounds per hour for long thin shreds.

The PAVFM is further limited in that it cannot handle frozen or semi-frozen products, as such products can cause damage to the cutting knives. Consequently, the PAVFM is poorly suited for cutting cheese having a high-fat or high-moisture content, which generally is too soft and fragile to cut unless it is in a frozen or semi-frozen state.

Yet another shortcoming of the PAVFM is its inability to produce a particular long, thin, crescent-shaped shred of cheese that is especially desirable to retail sellers of pizza. This shred is approximately ¹⁄₁₆" thick by ⅛" wide, and ranges in length between 1½" and 3. The shred is curved across its width, giving it a generally crescent-shaped cross section, such as shown in FIG. 4. Although the PAVFM can produce a long thin shred with comparable dimensions, it is unable to produce a shred having this unique crescent shape. Moreover, the multiple cuts required to make a long thin shred with the PAVFM often result in a substandard product with a low percentage of quality shreds mixed together with many small broken pieces. In addition to the crescent-shaped shred, there are many other commercially desirable shreds that the PAVFM cannot make, such as a shaved shred, for example. The shaved shred is ¹⁄₃₂" thick by ¹⁄₃₂" wide by ½" long, and is popular in the fast food industry.

Previously, to make a long, thin, crescent-shaped shred, shaved shred, or the like, cheese producers had to use a different commercial machine, referred to herein as a "prior art horizontal feed shredder," or "PAHFS" for short. The PAHFS is described below with reference to FIGS. 5–7.

In FIG. 5, the PAHFS is designated generally by reference numeral 200. The PAHFS includes a feed hopper assembly 202 having a feed opening 108, a lower discharge chute 204, and a stationary, generally cylindrical, horizontally-oriented cutting head assembly 206. The cutting head assembly 206 is housed within the space defined by the feed hopper assembly 202 and lower discharge chute 204. By "horizontally-oriented" it is meant that the cutting head assembly 206 is oriented such that its cylindrical axis is substantially vertical. The cutting head assembly 206 includes an upper support ring 210 having multiple cutting heads 212 mounted therearound in an end-to-end arrangement. In the embodiment shown, the cutting head assembly 206 has eight cutting heads 212. The upper support ring 210 and cutting heads 212 are mounted on a cutting head support 214, which in turn is rigidly mounted with respect to a frame 216. The cutting head assembly 206 has an internal diameter of approximately 14" and a depth of approximately 4.18".

Referring to FIGS. 6A and 6B, each cutting head 212 includes a shoe 220 and a corrugated knife 218 that is clamped to the leading edge of the shoe 220 by a knife clamp 222, a knife holder 224, and a plurality of screws 226. Alternating parallel ridges 228 and grooves 230 are formed on the side of the shoe 220 that faces the interior of the cutting head assembly 206.

The PAHFS further includes an impeller 232 mounted within the cutting head assembly 206 for rotation in a clockwise direction, indicated by arrow F in FIG. 7, about a substantially vertical axis. The impeller 232 is coupled to an impeller drive assembly 234 through an opening (not shown) in the cutting head support 214. The impeller 232 includes a disc-shaped base plate 236 and a ring-shaped upper plate 238, with five circumferentially-spaced paddles 240 fitted therebetween. Either a 5 or 7½ horsepower motor 242 is coupled to the impeller drive assembly 234 for rotating the impeller 232.

The operation of the PAHFS is described below with primary reference to FIG. 7. Blocks of mozzarella cheese 260, for example, are fed through the feed opening 208 of the feed hopper assembly 202 to the interior of the cutting head assembly 206, where, due to rotation of the impeller 232, they are propelled outward and slid around the inner periphery of the stationary cutting head assembly 206. As an impeller paddle 240 pushes the cheese block 260 past a corrugated knife 218, a plurality of shreds 270 are cut from the outer face of the block 260. The shreds 270 fall into the lower discharge chute 204, which directs the shreds 270 to a conveyor (not shown) or the like.

In the mode of operation described above, the PAHFS produces shreds, but it also can be adapted to produce slices by widening the space between adjacent cutting heads. The PAHFS is unable, however, to produce dices.

Tables 4–6 list production rate data for three different cuts of cheese that can be made with the PAHFS—the standard shred and long thin shred discussed above in connection with the PAVFM, as well as a long, thin, crescent-shaped shred. For each type of cut, the input product is a block of mozzarella cheese, anywhere from 2"–4" thick by 2"–4" wide. The cheese is unfrozen and at a temperature of about 32–38° F. Because the PAHFS does not make transverse cuts, the length of the input product is the same as the length of the output product. In each example, the impeller is driven at approximately 450 RPM.

TABLE 4

PAHFS data for standard shreds.

| Shred Dimensions | ⅛" thick × ⅛" wide × ¾" long |
|---|---|
| PAHFS Max. Output (5 HP Motor) | ~3200 lbs/hr |
| PAHFS Max. Output (7½ HP Motor) | ~3600 lbs/hr |

TABLE 5

PAHFS data for long thin shreds.

| Shred Dimensions | 1/16" thick × ⅛" wide × 1½" long |
|---|---|
| PAHFS Max. Output (5 HP Motor) | ~900–1000 lbs/hr |
| PAHFS Max. Output (7½ HP Motor) | ~1000–1200 lbs/hr |

TABLE 6

PAHFS data for long, thin, crescent-shaped shreds.

| Shred Dimensions | 1/16" thick × ⅛" wide × 2–3" long |
|---|---|
| PAHFS Max. Output (5 HP Motor) | ~900–1000 lbs/hr |
| PAHFS Max. Output (7½ HP Motor) | ~1000–1200 lbs/hr |

With a maximum product output of up to 3600 pounds per hour for standard shreds, the PAHPS is only marginally better than the modified PAVFM in terms of production for that type of cut. For long thin shreds the output of the PAHFS drops to about 1000–1200 pounds per hour, slightly better than the PAVFM, but less than the output of the modified PAVFM. The maximum output for the long, thin, crescent-shaped shred is only about 1000–1200 pounds per hour.

The inventors believe that the behavior of the cheese blocks once inside the cutting head assembly 206 limits the efficiency of the PAHFS. When cheese blocks are fed to the cutting head assembly 206, they momentarily spin, much like a top, near the center of the impeller base plate 236, before being propelled outward toward the inner surface of the cutting head assembly 206. Invariably, it appears, the cheese blocks are propelled toward the same segment of the cutting head assembly 206. That segment typically ranges from about ⅛ to about ⅓ of the circumference of the cutting head assembly. This can lead to an uneven distribution of cheese blocks among the impeller paddles 240. Further, the inventors have observed that most of the time only the bottom half of the knives 218 are actually used to shred the cheese blocks, presumably because the cheese blocks tend to settle near the horizontal base plate 236 of the impeller 232. Not only does this result in a failure to utilize the entire available cutting area, but it can also contribute to an unwanted buildup of cheese blocks within the cutting head assembly 206.

The physical design of the discharge chute 204 further limits the maximum output of the PAHFS. At outputs higher than approximately 3600 pounds per hour, shreds are cut faster than they can exit the discharge chute 204, resulting in an accumulation of shreds around the cutting head assembly 206, especially in the area above the horizontal portion of the housing that surrounds the impeller drive assembly 234. As a result, the openings between adjacent cutting heads 212 become obstructed and cheese blocks begin to pile up in the cutting head assembly 206. Failure to promptly shut down the PAHFS and remove the excess cheese can cause complete blockage of or damage to the machine. For 1/16" or thinner shreds having a length of 3" or more, this same problem can occur at outputs as low as 1000 pounds per hour.

Apart from the shortcomings of the PAVFM and PAHES individually, the need for multiple machines to meet varying customer demands is in itself a major source of inefficiency. Separate machines require a larger initial outlay of capital, they nearly double maintenance and repair costs, and they occupy more than twice the amount of space in a production facility than would a single machine with the functionality of both the PAVFM and the PAHFS.

SUMMARY OF THE INVENTION

The present invention addresses the foregoing shortcomings in the art by providing an improved shredding assembly, referred to herein as a "vertical feed shredder," or "VFS" for short, suitable for installation in an existing PAVFM, preferably an already modified PAVFM, or for incorporation in an independent machine.

The VFS is fully interchangeable with the present PAVFM slicing case and impeller and requires just a few modifications to the existing PAVFM frame and driving mechanism for implementation. Equipped with the VFS, the PAVFM is converted into a machine capable of producing long, thin, crescent-shaped shreds and other types of shreds that the PAVFM alone cannot make, as well as efficiently handling frozen or semi-frozen cheese. The PAVFM slicing case and impeller easily can be reinstalled whenever it is desired to operate the PAVFM in its conventional manner. Given the added versatility imparted to the PAVFM by the VFS, the PABFS is no longer needed, freeing up valuable production facility space and reducing maintenance and repair costs. Significantly, the cost to retrofit a PAVFM with the VFS is less than one half the cost of a new PAHFS.

Surprisingly, the inventors found that by retrofitting a modified PAVFM with the VFS, product output for the standard shred increased nearly threefold compared to the modified PAVFM alone and the PAHFS, and approximately fourfold compared to the non-modified PAVFM. Even more dramatically, product output for the long thin shred was nearly five times higher with the VFS than with the non-modified PAVFM and the PAHFS and more than three times higher than with the modified PAVFM alone. Product output for the long, thin, crescent-shaped shred was found to be approximately five times higher with the VFS than with the PAHFS. Remarkably, the VFS achieves these higher outputs with just two blades, as compared to eight knives in the PAHFS, and more than 80 knives in the PAVFM.

By incorporating the VFS in an independent, standalone machine, as opposed to using it as a retrofit for an existing PAVFM, an even more astounding increase in production can be achieved. For example, the inventors have found that a single VFS standalone machine with an internal housing diameter of approximately 24", when used to shred mozzarella cheese, can produce more than 28,000 pounds per hour of standard shreds, more than 24,000 pounds per hour of long thin shreds, and more than 18,000 pounds per hour of long, thin, crescent-shaped shreds. A single VFS standalone machine thus is able to match the production of upwards of at least half a dozen prior art machines.

In the description and claims that follow, the present invention is discussed broadly in terms of cutting or shredding a "product." As used herein, the term "product" refers generally to a product that can be cut, for example a food product such as cheese, potatoes, fruits, vegetables, processed meats, and the like. Depending on the context, the term "product" may refer to either one or a plurality of pieces, such as one or more blocks of cheese. In a preferred embodiment, the product is mozzarella cheese that is in either a frozen or semi-frozen state. As used herein, "frozen" with respect to mozzarella cheese means cheese that is at a temperature below about 22° F., and "semi-frozen" means cheese that is at temperature between about 22° F. to about 30° F.

In one aspect, the present invention relates to an apparatus for shredding a product. The apparatus includes a housing and an impeller rotatably mounted within the housing. Preferably, the housing is cylindrical and has a first face that is at least partially open, a second face that may be open or closed, and a cylindrical sidewall. The inner periphery of the cylindrical sidewall bounds the interior of the housing.

The impeller includes one or more paddles for directing the product around the inner periphery of the housing as the impeller rotates. As few as one impeller paddle could be used, but preferably a plurality of impeller paddles are employed. The maximum number of impeller paddles that can be used depends on the size of the housing and the size of the input product; there must be sufficient space for the input product to nest along the inner periphery of the housing between adjacent impeller paddles.

The apparatus further includes means for feeding the product to the interior of the housing. The feeding means preferably is a feed hopper aligned with an opening in the first face of the housing, but the feeding means can also be any number of other known devices, such as a conveyor, funnel, chute, or other structure capable of delivering the product to the interior of the housing. The particular feeding means employed is not critical to the apparatus of the present invention.

The apparatus additionally includes means for rotating the impeller so as to direct the product around the inner periphery of the housing. Preferably, the impeller is coupled to a rotary shaft through an opening in the second face of the housing. The rotary shaft, in turn, can be coupled to a motor via a conventional arrangement of pulleys, belts, shafts, and gears. The particular means used to rotate the impeller is not critical to the apparatus of the present invention. Various other arrangements utilizing well-known components, such as motors, pulleys, belts, shafts, gears, chains, sprockets, or the like, would also be suitable.

The rotating means should be configured to rotate the impeller about a substantially horizontal axis of rotation. That is, the axis of rotation should be closer to horizontal than it is to vertical, and oriented such that gravity will have a negligible influence on where along an individual impeller paddle the product is carried—i.e., whether on the left, the right, or in the middle. In other words, the product, upon being fed to the housing, will migrate relatively uniformly across the length of the impeller paddles, as opposed to settling near one side thereof, as in the PAHFS. The inventors expect that those skilled in the art will be able to design machines with impellers having axes of rotation that are not strictly horizontal, and that in these machines gravity likewise will have a negligible influence on where along the impeller paddles the product is carried. For example, the inventors believe that an impeller whose axis of rotation is within 30 degrees of horizontal would be suitable, even though productivity may decrease slightly as the axis becomes more upright. The phrase "substantially horizontal axis of rotation," as it is used with respect to the impeller, is intended to cover all such designs, provided, of course, the axis of rotation is closer to horizontal than it is to vertical.

The apparatus also includes means for cutting a plurality of shreds from a surface of the product facing the inner periphery of the housing, and means by which the plurality of shreds are discharged from the housing. The cutting means can comprise one or more cutting implements, such as blades, knives, or the like. Preferably, each cutting implement is preceded by a contoured segment of the inner periphery of the housing. The contoured segment(s) can be formed integrally with the housing sidewall, or as separate plates for insertion in the housing. A cutting implement is said to be "preceded" by a contoured segment if the product normally travels past the segment before reaching the cutting implement, without passing by another contoured segment or cutting implement in the meantime. Conversely, a cutting implement is said to be "followed" by a contoured segment if the product normally travels past the cutting implement before reaching the segment, without passing by another contoured segment or cutting implement in the meantime.

In one preferred embodiment, an even number of cutting implements, are disposed along the inner periphery of the housing. Each cutting implement has a contoured cutting edge, and each is preceded and followed by a contoured segment. An opening is provided in the sidewall of the housing between each cutting implement and the contoured segment that precedes it. Preferably, the segment contours comprise alternating parallel ridges and grooves that extend in the direction in which the product travels around the inner periphery of the housing. The segment contours can be any shape, such as triangular, square, curved, sinusoidal, etc. Preferably, the segment contours are the same shape as the cutting implement contours, and the contours of the segment that follows each cutting implement are aligned with the contours of the cutting implement that the segment follows, and the contours of the segment that precedes each cutting implement are offset relative to the contours of the cutting implement that the segment precedes. By "aligned" it is meant that the segment contours line up exactly with the cutting implement contours. That is, assuming the contours of both the segment and cutting implement consist of triangular ridges and grooves, if a circumferential path around the inner periphery of the housing passes over the apex of a ridge on the cutting implement, then it will also pass over the apex of a ridge on the contoured segment that follows the cutting implement. If the contours are not substantially aligned, then they are said to be "offset."

In accordance with this embodiment, a product to be shred is fed to the interior of the housing, where it is collected by an impeller paddle for sliding travel therewith around the inner periphery of the housing. As the impeller paddle pushes the product past a cutting implement, a plurality of shreds are cut from the product and discharged through an opening in the sidewall of the housing between the cutting implement and the contoured segment that precedes it. The next contoured segment helps guide the product to the next cutting implement, whereupon more shreds are cut from the product. This repeats for each successive cutting implement, until the product is substantially completely shredded, which may take several revolutions around the housing.

As those in the cheese-making industry will appreciate—especially those familiar with the PAHFS—any number of cutting implement configurations can be utilized, depending upon the type of cut desired. All that is necessary is that the cutting implement be shaped and positioned such that a plurality of shreds are cut from the product as it passes by the cutting implement. The precise configuration of the cutting implement can vary, depending upon such factors as the type of product to be cut, the shape of the outer face of the product when it reaches the cutting implement, and the style of shred desired. Moreover, several different cutting implements and contoured segments can be simultaneously employed in the apparatus, for instance, if it is desired to make a product comprising a mixed variety of cuts.

According to another aspect of the present invention, a shredding apparatus includes a housing with an impeller mounted for rotation therein. An interior space of the housing is bounded by a generally cylindrical sidewall. The apparatus additionally includes a feed hopper and a driving mechanism, coupled to the impeller, for rotating the impeller about a substantially horizontal axis of rotation. A product to be shred is fed through the feed hopper to the interior space of the housing, where an impeller paddle directs the product around the inner periphery of the housing. The sidewall of the housing includes at least one contoured segment, and the housing further includes a contoured cutting implement that follows the contoured segment. An opening is provided in the sidewall of the housing between the contoured segment and the cutting implement that follows it. Preferably, the contours of the cutting implement are different from the contours of the segment that the cutting implement follows. By "different" it is meant that the cutting implement contours have a different size and/or shape than, and/or are offset relative to, the contours of the segment that the cutting implement follows.

In yet another aspect, the present invention relates to a shredder housing suitable for use in a cutting apparatus. The shredder housing either can be permanently affixed in the cutting apparatus or it can be removable. Preferably, the shredder housing is interchangeable with another housing. The shredder housing includes a generally vertically-oriented, preferably cylindrical case. By "generally vertically-oriented" it is meant that the case is oriented such that its cylindrical axis is substantially horizontal, and such that a product to be cut will travel around the case in a substantially vertical plane. A peripheral wall, including at least one corrugated segment, bounds an interior space of the case. The corrugations of the segment preferably comprise alternating ridges and grooves running in the direction in which the product travels around the case. The shredder housing further comprises a cutting implement with a corrugated cutting edge that is mounted across an opening in the peripheral wall of the case from the corrugated segment. Preferably, the corrugations of the cutting implement are different than the corrugations of the segment that precedes it.

In a further aspect, the present invention relates to an apparatus having interchangeable first and second cutting assemblies. By "interchangeable" it is meant that any one of two or more cutting assemblies can be used with the apparatus. According to this aspect of the invention, the apparatus includes means for supplying a product to be cut to a selected one of the first and second cutting assemblies, whichever is currently installed in the apparatus. Preferably, the supplying means comprises a feed hopper that is aligned with an opening in the selected cutting assembly, but the supplying means also can be any number of other known devices, such as a conveyor, funnel, chute, or other structure capable of delivering the product to the selected cutting assembly.

The first cutting assembly includes a housing having an interior where the product is received from the supplying means. The housing interior is bounded by a substantially smooth inner periphery. The first cutting assembly further includes an impeller rotatably mounted within the housing for sliding the product around the inner periphery of the housing, means for cutting slices from the product as the impeller slides it around the housing, and means by which the slices are discharged from the housing. Here, the cutting means can be a cutting implement such as a blade, knife, or the like, preferably with a straight cutting edge. The means by which the slices are discharged from the housing can be an opening in the housing adjacent to the cutting means. An example of the first cutting assembly is the slicing case and impeller assembly conventionally utilized in the PAVFM, described above.

The second cutting assembly includes a housing having an interior for receiving the product from the supplying means and an impeller rotatably mounted within the housing. The housing interior is bounded by an inner periphery. The impeller includes one or more impeller paddles for sliding the product around the inner periphery of the housing as the impeller rotates. The second cutting assembly additionally includes means for cutting a plurality of shreds from the resulting contoured face of the product as the impeller slides the product around the inner periphery of the housing, and means by which the plurality of shreds are discharged from the housing.

The apparatus according to this aspect of the present invention further includes means for rotating the impeller of the selected cutting assembly about a substantially horizontal axis of rotation. The rotating means can comprise a motor coupled to the impeller via a known arrangement pulleys, belts, shafts, gears, chains, sprockets, or the like. Preferably, the rotating means comprises a reversible motor that rotates the impeller in one direction when the first cutting assembly is installed, and in an opposite direction when the second cutting assembly is installed.

Optionally, the apparatus can be provided with auxiliary cutting means for cutting the slices after they are discharged from the housing of the first cutting assembly. The auxiliary cutting means is operable in conjunction with the first cutting assembly, but not with the second cutting assembly. That is, when the second cutting assembly is installed in the apparatus, the auxiliary cutting means is not used. The auxiliary cutting means can comprise circular knives for cutting the slices into strips, and, if desired, crosscut knives for cutting the strips into dices. An example of the auxiliary cutting means is the auxiliary cutting assembly described above in connection with the PAVFM. If an auxiliary cutting means is provided, the apparatus should be equipped with means for driving the auxiliary cutting means. The driving means can comprise a motor coupled to the auxiliary cutting means via a known arrangement pulleys, belts, shafts, gears, chains, sprockets, or the like. The driving means and the rotating means can comprise the same motor, but preferably comprise separate motors.

In another aspect, the present invention relates to a method of retrofitting a cutting apparatus with a shredder assembly in order to enable the cutting apparatus to make cuts that it could not otherwise make without the shredder assembly. The term "cuts" in this context refers to specific types of cuts, e.g., crescent-shaped shreds, long thing shreds, standard shreds, etc., as well as general types of cuts, e.g., slices, shreds, dices, etc. According to this method, an existing generally vertically-oriented housing and impeller, such as conventionally utilized in the PAVFM, are detached from the cutting apparatus. A shredder assembly including a generally vertically-oriented housing, a cutting implement, and an impeller then is installed in the cutting apparatus. The inner periphery of the shredder assembly housing includes at least one corrugated segment. The cutting implement is also corrugated, and is secured to the inner periphery of the housing across an opening therein from the corrugated segment. The impeller is mounted within the housing and coupled to a driving mechanism that rotates the impeller within the housing. Optionally, the direction in which the driving mechanism rotates the impeller can be reversed. Preferably, the method according to this aspect of the present invention is reversible, so that the shredder assembly can be detached and the previous housing and impeller can be reinstalled.

In still another aspect, the present invention relates to a method of shredding a product. In accordance with this method, the product is fed to an interior of a housing that has an impeller mounted for rotation therein. The impeller is rotated about a substantially horizontal axis of rotation at a speed sufficient to force the product against the inner periphery of the housing, into sliding engagement therewith, throughout each revolution of the impeller. As the impeller slides the product along the inner periphery of the housing, a plurality of shreds are cut from the outer face of the product. The shreds thereafter are discharged from the housing.

A better understanding of these and other aspects, features, and advantages of the present invention may be had by reference to the drawings and to the accompanying description, in which there are illustrated and described some preferred embodiments of the invention.

BRIEF DESCRIPTION OF THE DRAWINGS

Throughout the figures, like reference numerals have been used for like or corresponding parts.

DESCRIPTION OF THE PREFERRED EMBODIMENTS

For illustrative purposes, the preferred embodiments of the present invention are described in connection with the production of cheese, specifically, mozzarella cheese that is in either a frozen or semi-frozen state. The apparatuses and methods of the present invention are not limited to the production of cheese, however, and can be used in the production or processing of any number of products, including other food products such as potatoes, fruits, vegetables, processed meats, and the like.

1. VFS Retrofit

In one preferred embodiment, the VFS is installed in an existing PAVFM, preferably, a modified PAVFM. The so-modified machine, referred to herein as a "VFS retrofit," is described below with reference to FIGS. 8–13.

Figure 8:
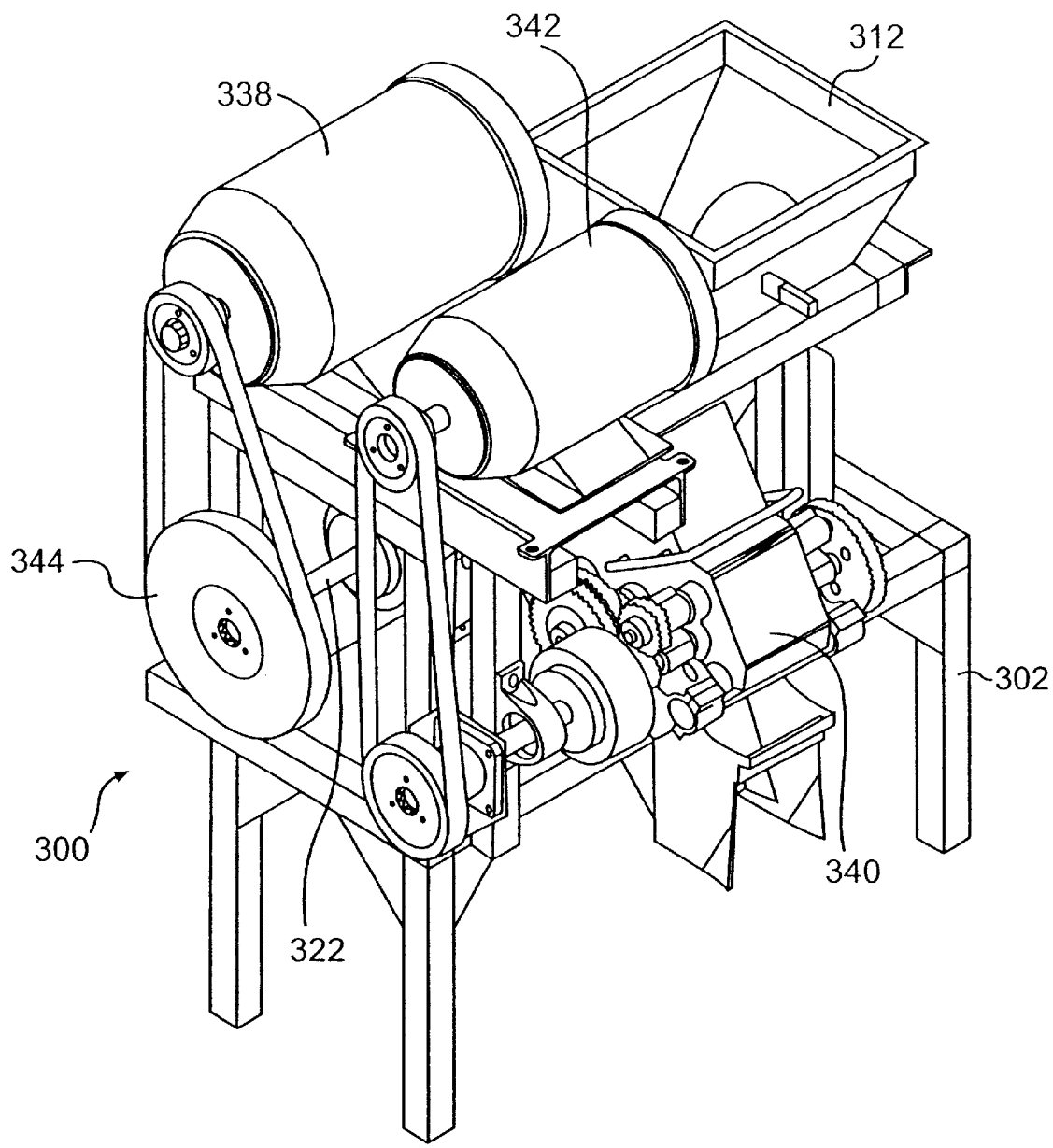
FIG. 8 is a perspective view of an apparatus according to one embodiment of the present invention.
Figure 9:
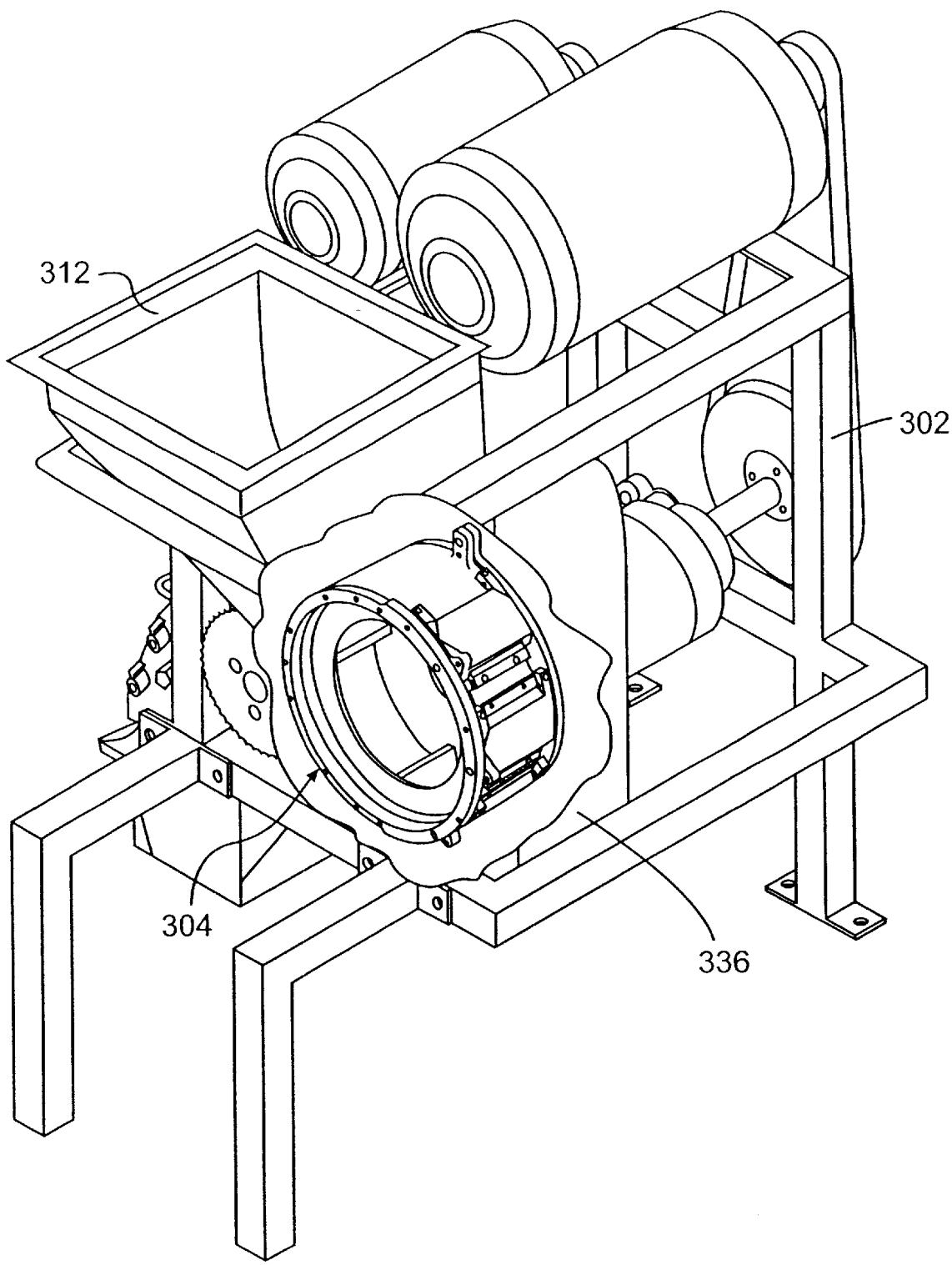
FIG. 9 is a partial cut-away, rotated, perspective view of the apparatus shown in FIG. 8.
Figure 10:
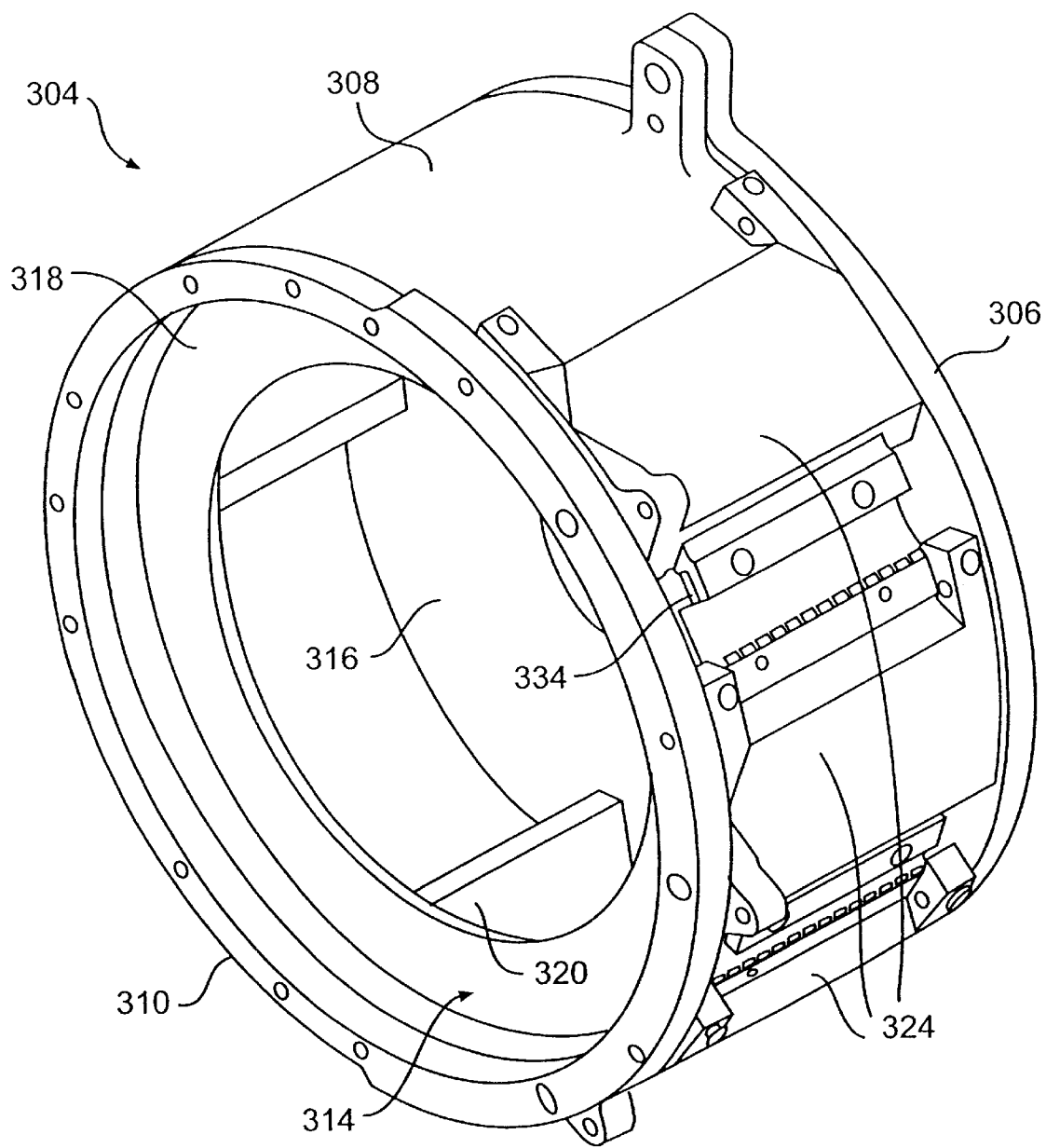
FIG. 10 is a perspective view of a housing and impeller of the apparatus shown in FIG. 8.

In FIG. 8, the VFS retrofit is designated generally by reference numeral 300. The VFS retrofit includes a frame 302, on which a generally cylindrical, vertically-oriented housing 304, shown in FIG. 9, is rigidly mounted. As best seen in FIG. 10, the housing 304 includes a rear wall 306, a cylindrical sidewall 308, and an open front face that is encircled by an annular ring 310. The housing 304 has an internal diameter of approximately 12" and a depth of approximately 4.08". A feed hopper 312, shown in FIG. 8, is aligned with the open front face of the housing 304 for delivering a product to be cut to the interior of the housing 304.

Figure 11:
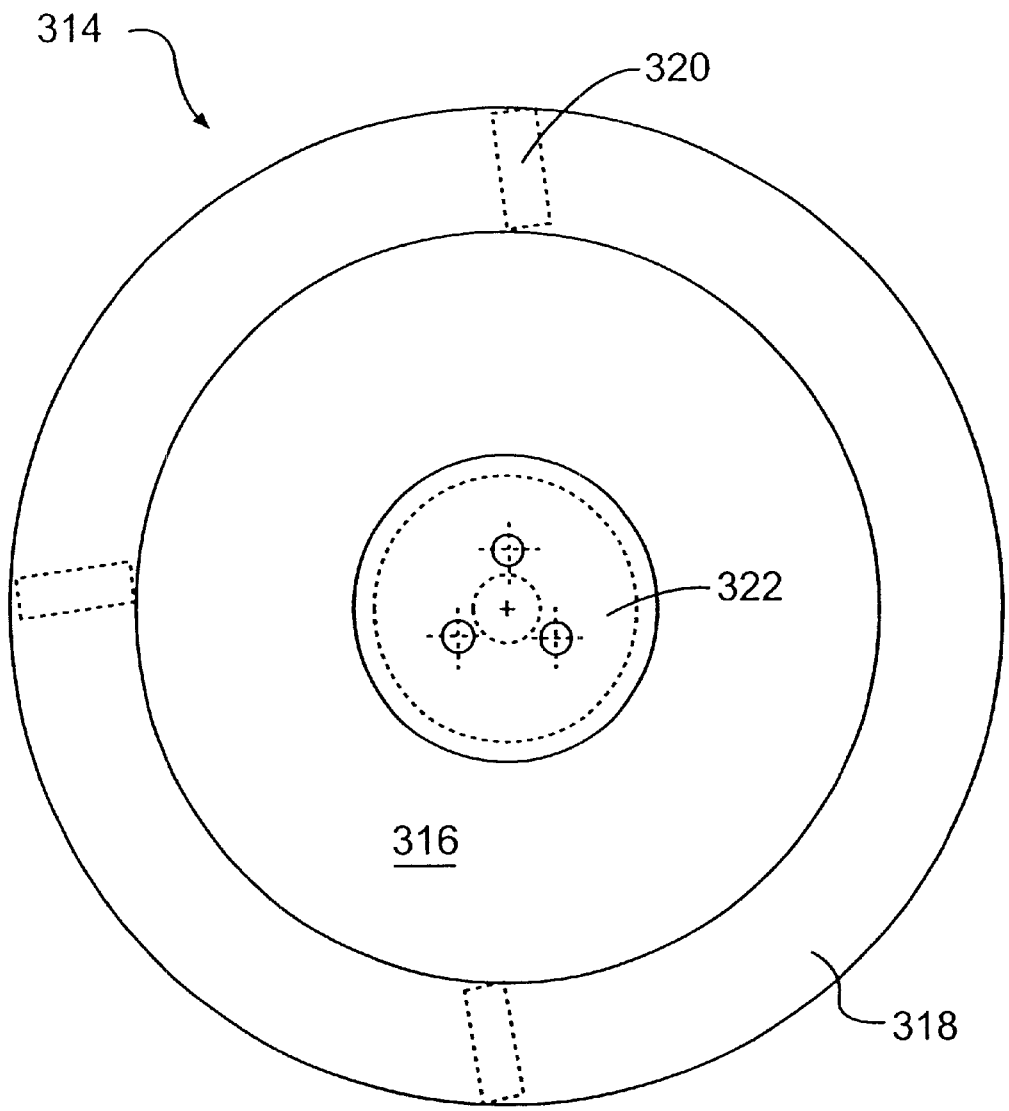
FIG. 11 is a front view of the impeller of the apparatus shown in FIG. 8.

An impeller 314, such as shown in FIGS. 10 and 11, is mounted within the housing 304 for rotation about a substantially horizontal axis. The impeller 314 includes a disc-shaped base plate 316 and an annular front plate 318, with four circumferentially-spaced paddles 320 fitted therebetween. The impeller base plate 316 is bolted to a drive shaft 322 that extends through a central opening (not shown) in the rear wall 306 of the housing 304. Advantageously, each paddle 320 is angled toward the cylindrical sidewall 308 of the housing so that the angle between the side of the paddle 320 on which the product is carried and the sidewall 308 is less than 90°. In the preferred embodiment shown, the angle between each paddle 320 and the sidewall 308 is approximately 80°. By angling the paddles 320 in this manner, the impeller 314 imparts both forward and outward momentum to the product as it carries the product around the housing 304. Alternatively, perpendicular or slightly obtuse paddle arrangements could be used.

Figure 12:
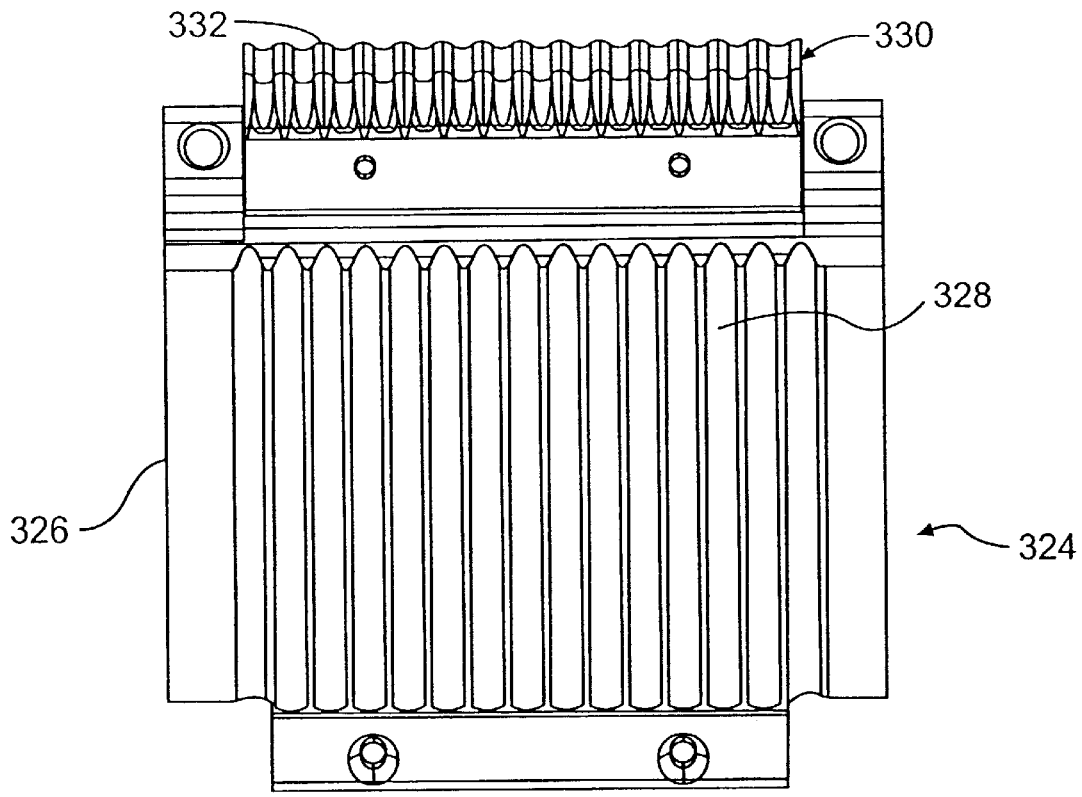
FIG. 12 is an elevational view of a feed plate of the apparatus shown in FIG. 8.
Figure 13:
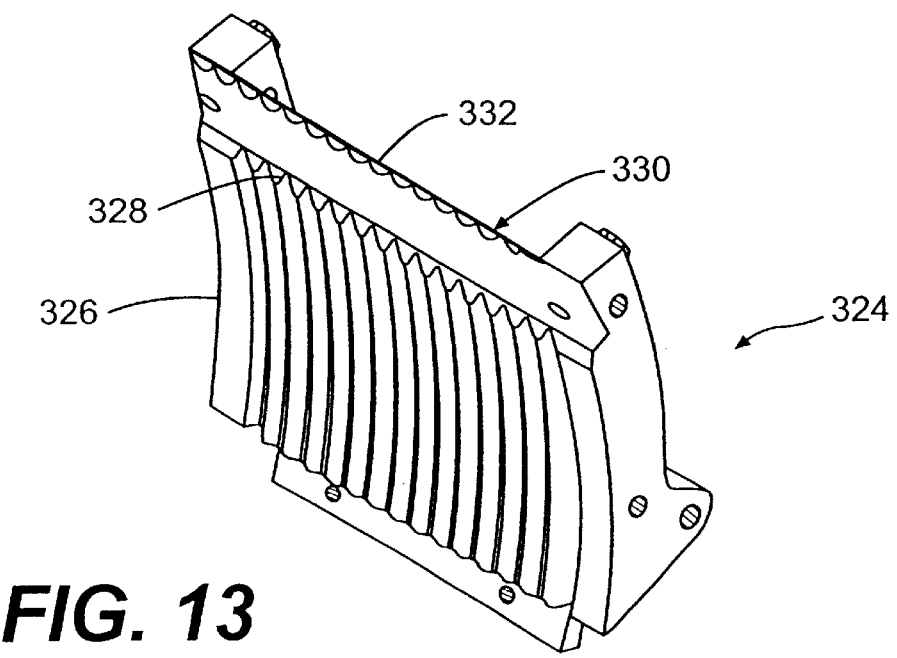
FIG. 13 is a perspective view of the feed plate shown in FIG. 12.

As illustrated in FIG. 10, the right-hand side of the housing 304 includes three feed plates 324. Each feed plate 324 is affixed between the annular ring 310 and the rear wall 306 of the housing 304 using screws or the like. Referring to FIGS. 12 and 13, each feed plate 324 includes a contoured segment 326 that has contours 328 integrally formed on the side thereof facing the interior of the housing 304. In the embodiment shown, the contours 328 consist of alternating parallel ridges and grooves that are aligned in the direction in which the product travels around the housing 304. In this embodiment, which is designed for producing crescent-shaped shreds, the ridges and grooves are rounded. For other shred types, the ridges and grooves may have a different shape, such as triangular or square. As shown, the contours of each segment 326 extend for an arc length of approximately 4", which, for the three segments 326 combined, corresponds to about 140° of the total housing circumference.

Figure 6B:
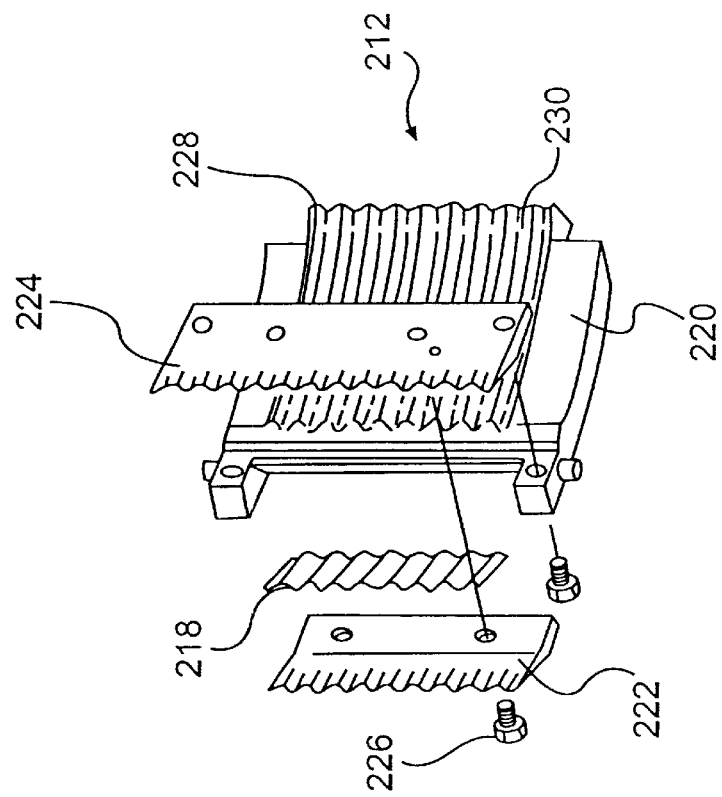
FIG. 6B is an exploded, reverse, perspective view of one of the individual cutting heads shown in FIG. 6A.
Figure 6A:
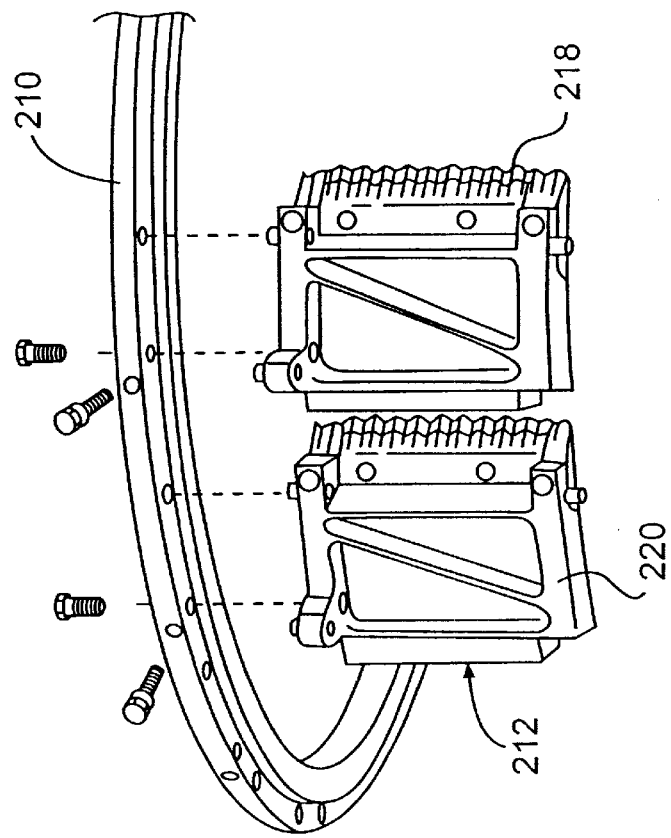
FIG. 6A is an exploded perspective view of two cutting heads of the PAHFS shown in FIG. 5.
Figure 7:
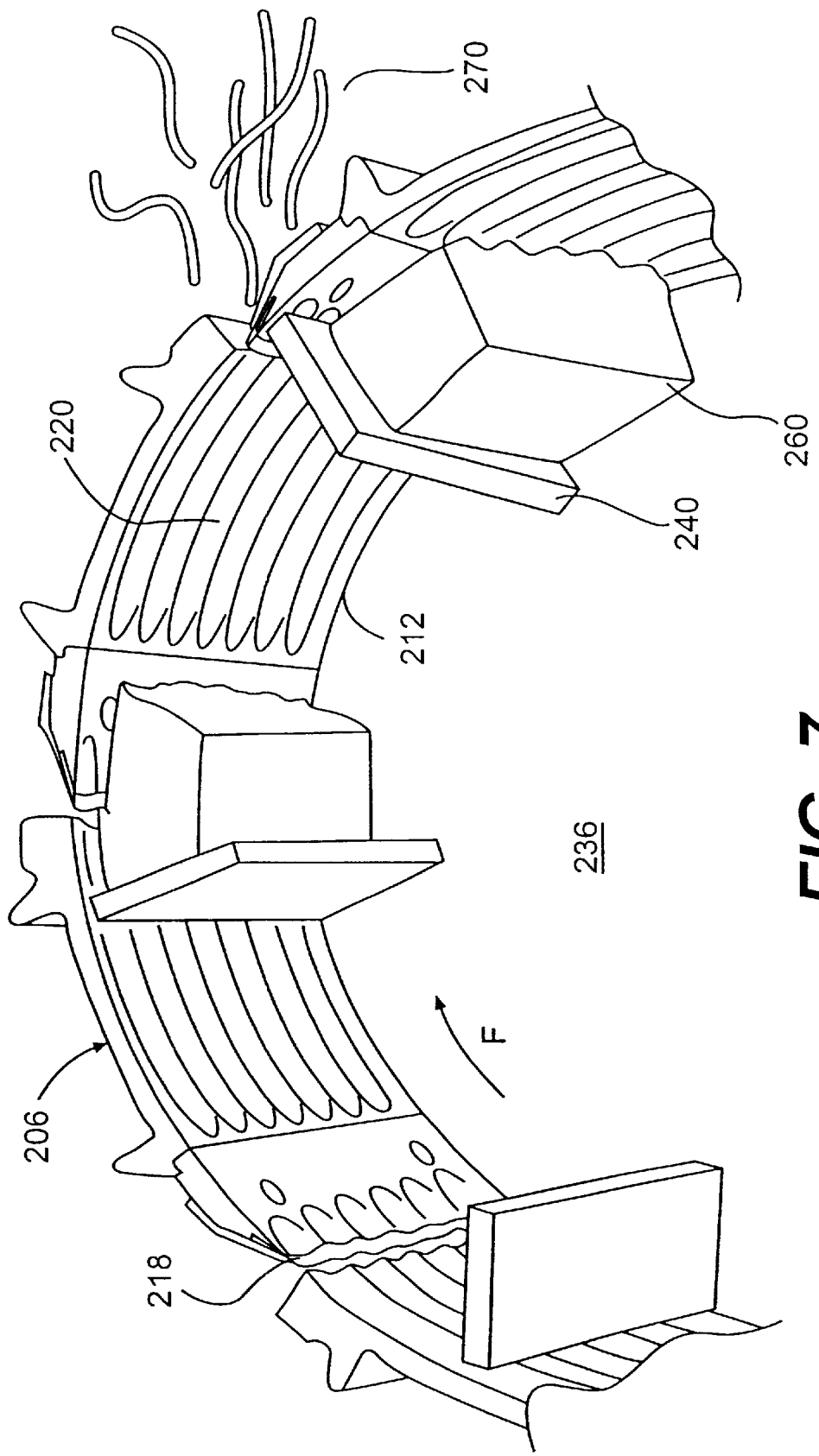
FIG. 7 is a partial perspective view of a cutting head assembly of the PAHFS shown in FIG. 5.

A cutting implement, such as a blade 330, is mounted near the leading edge of the feed plate 324 using conventional means, such as the clamp 222, holder 224, and screws 226 that clamp the knife 218 to each shoe 220 in the PAHFS, shown in FIG. 6. Like the contoured segment 326, the cutting edge of the blade 330 contains contours 332, consisting of rounded ridges and grooves. In the preferred embodiment shown, the ridges and grooves of the blade 330 are aligned with the ridges and grooves of the segment 326. As with the contoured segment, the ridges and grooves of the blade can have different shapes and sizes, depending on the type of cut desired.

The three feed plates 324 shown in FIG. 10 are basically identical, except that the uppermost feed plate does not have a blade 330 mounted thereto. Also, the ridges and grooves of the segment and blade of the middle feed plate are offset relative to the ridges and grooves of the segment of the uppermost feed plate and the segment and blade of the lowermost feed plate. Openings 334 are provided between adjacent feed plates 324, and a discharge chute 336, shown in FIG. 9, is provided on the right-hand side of the housing 304 for directing shreds to a conveyor (not shown) or the like after they are discharged from the openings 334. The feed plates 324 can be removed from the housing 304 by unfastening the screws that affix the feed plates 324 between the annular ring 310 and the rear wall 306 of the housing 304. The spacing between adjacent feed plates can be adjusted, or different feed plates can be used, to make different types of cuts. In fact, different feed plates can be used simultaneously should a mixed variety of cuts be desired.

As shown in FIG. 8, a variable frequency, reversible, 15 horsepower motor 338 is provided for rotating the impeller 314. The motor 338 is coupled to the impeller drive shaft 322 via a known pulley and gear assembly 344, shown in FIG. 8. By adjusting the frequency setting of the motor 338, the rotational speed of the impeller 314 can be controlled. This is particularly advantageous when going from a relatively thick cut to a thinner one, as thin cuts tend to crumple or collapse if the impeller 314 is run at too high a speed.

Figure 1:
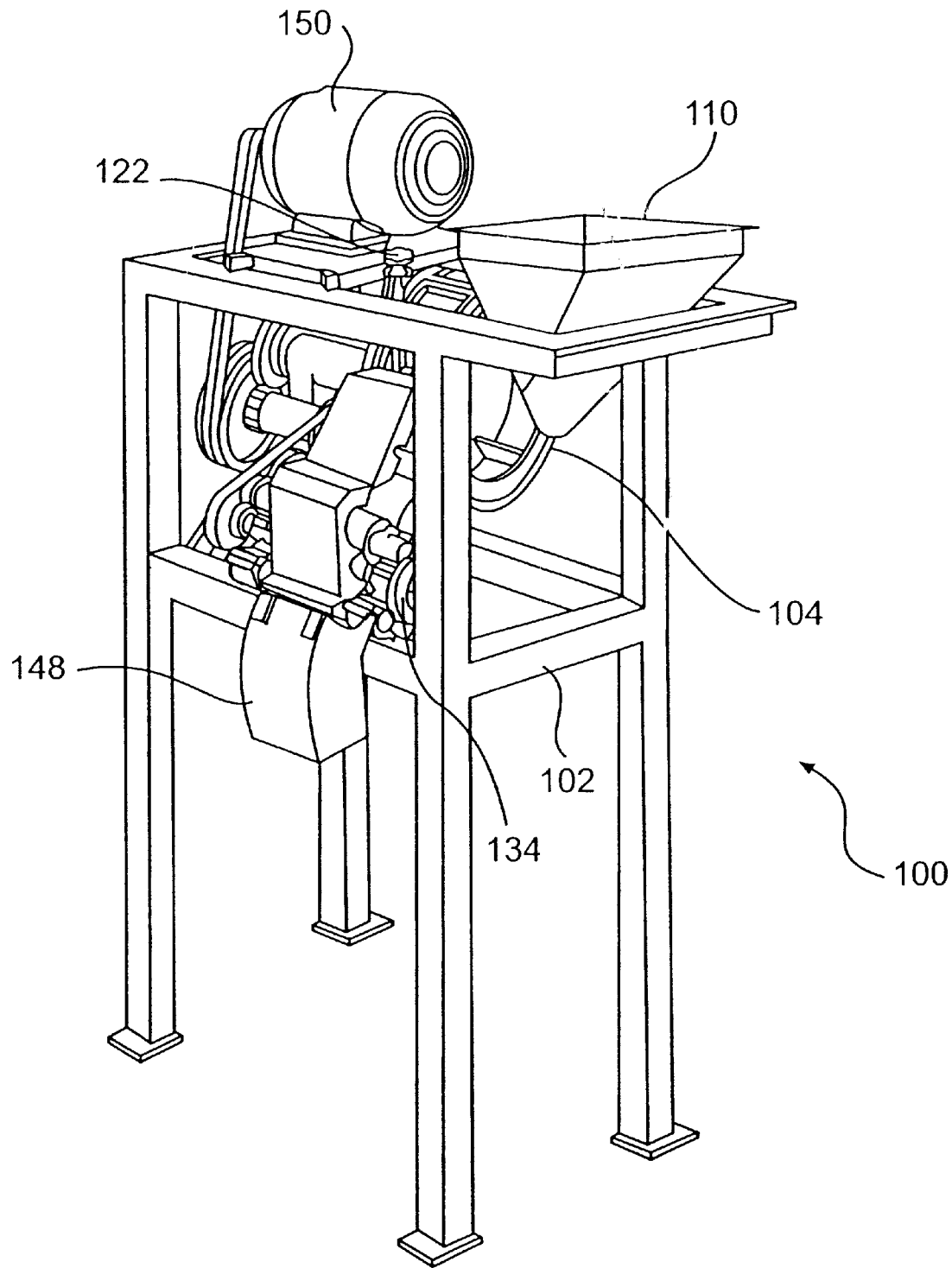
FIG. 1 is a perspective view of a prior art vertical feed machine ("PAVFM").
Figure 2:
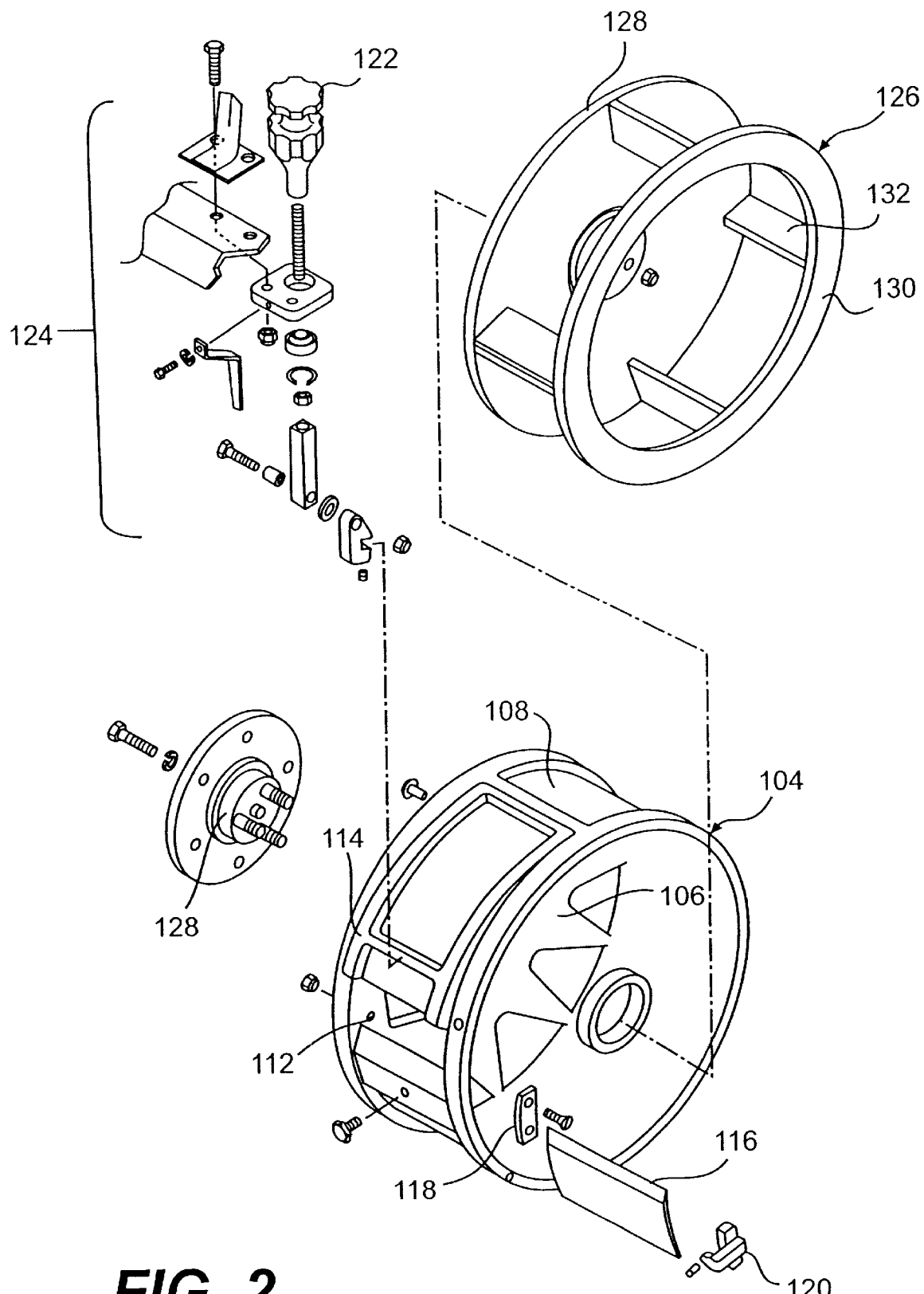
FIG. 2 is an exploded perspective view of a slicing case and impeller of the PAVFM shown in FIG. 1.
Figure 3:
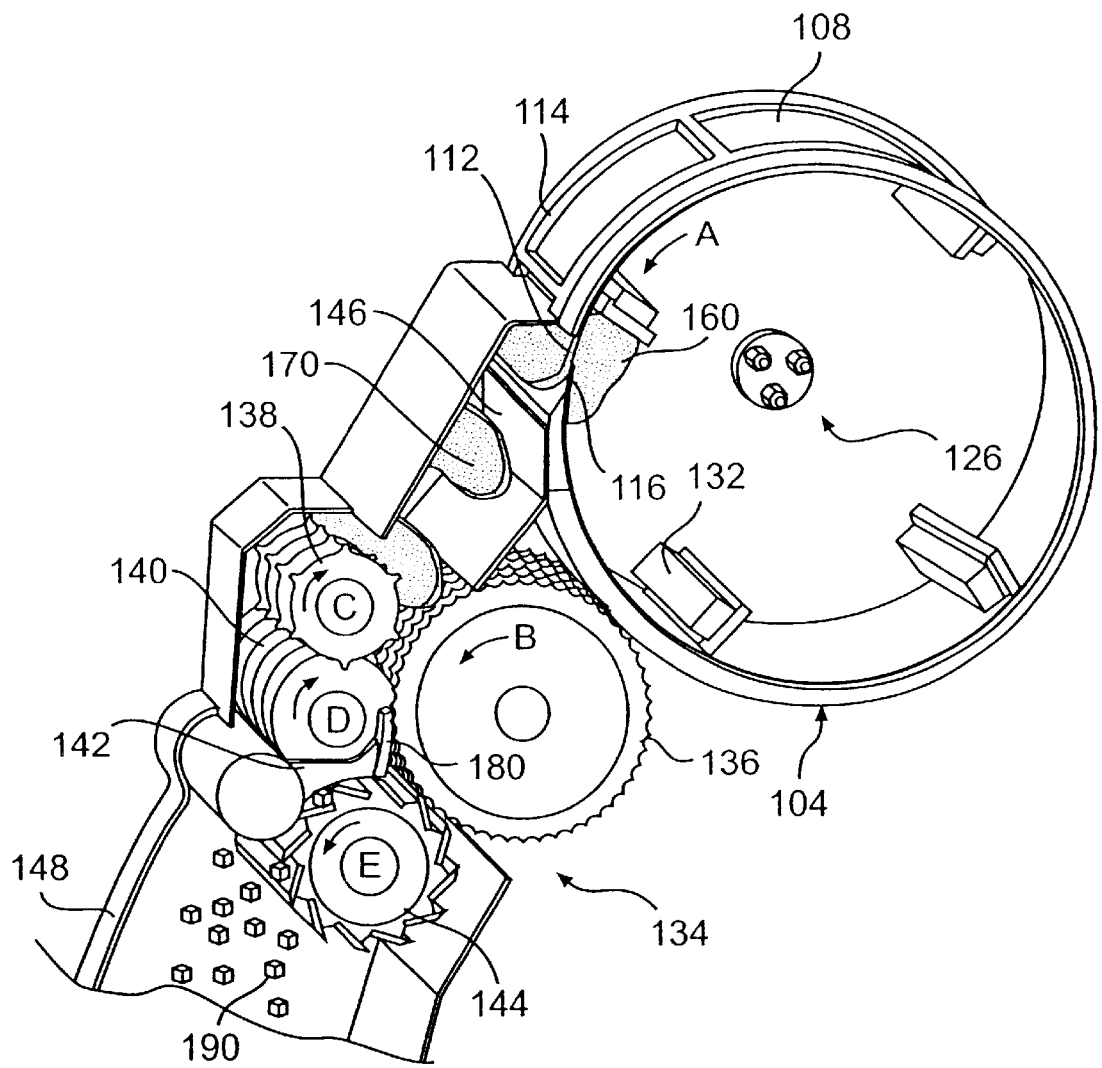
FIG. 3 is a cutaway view of a portion of the PAVFM shown in FIG. 1
Figure 4:
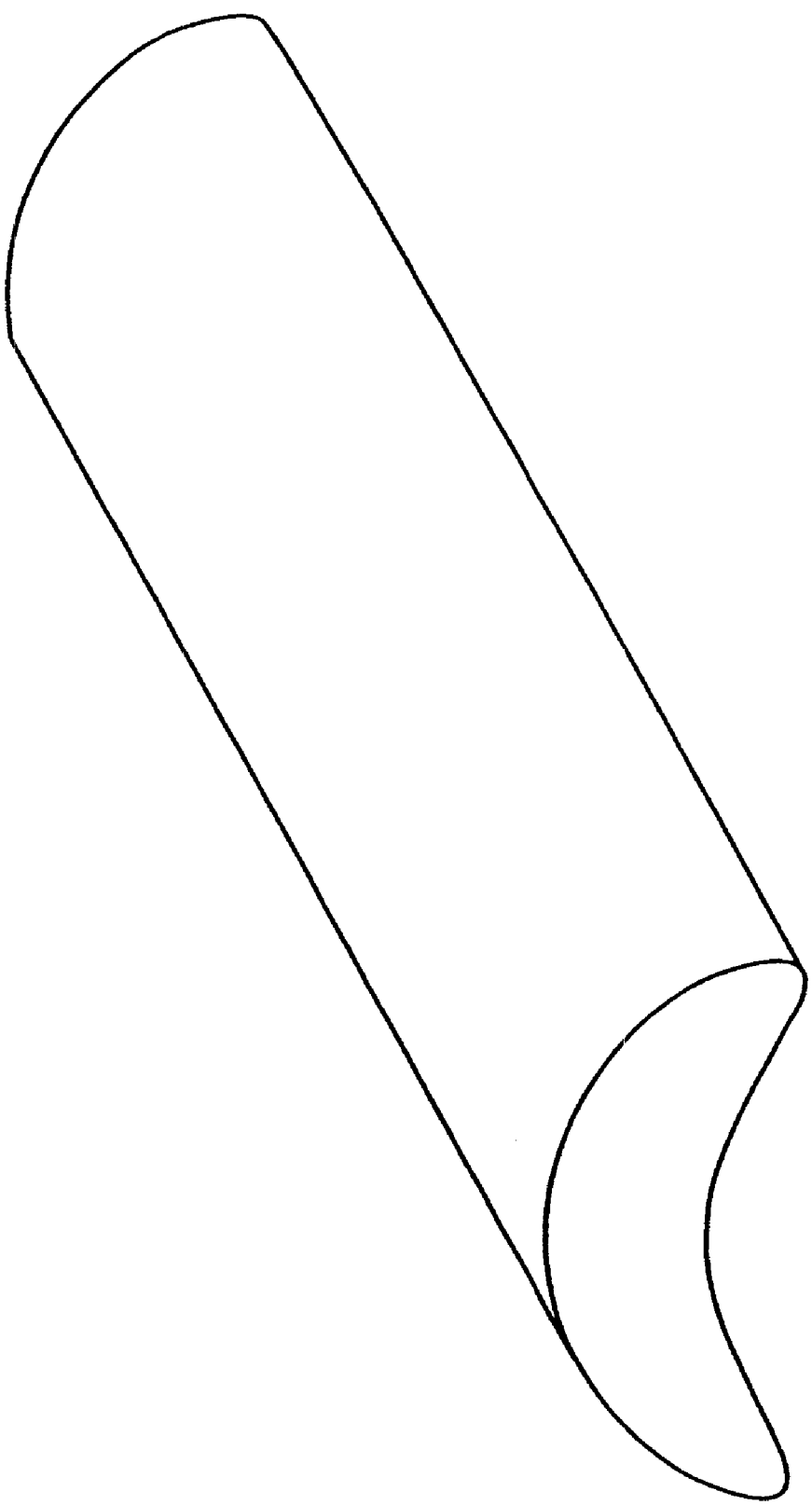
FIG. 4 is a perspective view of a long, thin, crescent-shaped shred of cheese.
Figure 5:
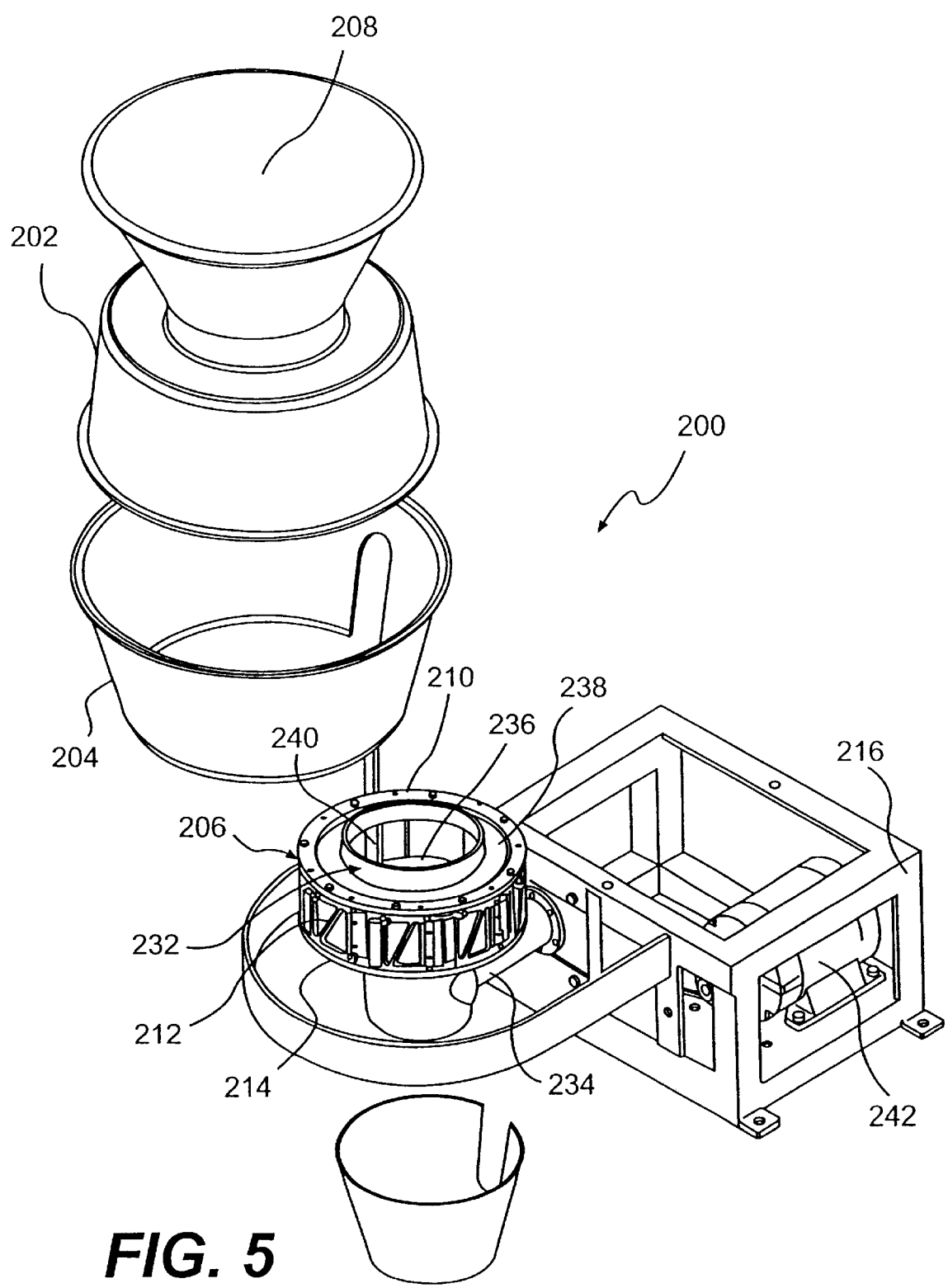
FIG. 5 is an exploded perspective view of a prior art horizontal feed shredder ("PAHFS").

The VFS retrofit utilizes many of the same components as the PAVFM. In fact, the VFS retrofit can be converted back to a modified PAVFM simply by removing the VFS housing 304 and impeller 314 and reinstalling the conventional PAVFM slicing case 104 and impeller 126, shown in FIG. 2. If this is contemplated, the VFS retrofit optionally may be equipped with an auxiliary cutting assembly 340, such as described above in connection with the PAVFM. In the embodiment shown, the auxiliary cutting assembly 340 is used only in conjunction with the conventional PAVFM slicing case and impeller. A 10 horsepower motor 342, for example, can be provided for driving rotation of the moving parts of the auxiliary cutting assembly 340. When the VFS housing 304 and impeller 314 are installed, the auxiliary cutting assembly 340 can be detached or disabled.

Preferably, all parts of the VFS retrofit with which the product comes into contact are constructed of stainless steel.

In operation, a product, such as blocks of cheese, is fed through the feed hopper 312 of the VFS retrofit to the interior of the housing 304. There, the cheese blocks are collected by the impeller paddles 320 for sliding movement therewith around the inner periphery of the housing 304. Centrifugal force ensures that the outer faces of the cheese blocks remain pressed against the inner periphery of the housing 304 throughout the entire revolution of the impeller 314. As an impeller paddle 320 pushes the cheese block past a contoured blade 330, a plurality of shreds are cut from the outer face of the cheese block and discharged through a respective opening 334 in the sidewall 308 of the housing 304. The contoured segment 326 following the blade 330 then helps guide the cheese block to the next blade, whereupon more shreds are cut from the cheese block. This repeats for each successive blade 330, until the cheese block is completely shredded. The resulting shreds fall into the discharge chute 336, where they are directed to a conveyor or the like for further processing, storage, or packaging.

Tables 7–9 list production rate data for three of the many different cuts of cheese that can be made with the VFS retrofit—namely, the standard shred and the long thin shred discussed above in connection with the PAVFM and PAHFS, as well as the long, thin, crescent-shaped shred discussed above in connection with the PAHFS. For each type of cut, the input product is a block of mozzarella cheese, anywhere from 1"–4" thick by 2"–4" wide. The cheese is semi-frozen, at a temperature of about 30° F. The length of the input product is the same as the length of the output product. The impeller rotational speed for the standard shred is about 450 RPM, and for the long thin shred and the long, thin, crescent-shaped shred it is about 360–450 RPM.

TABLE 7

VFS retrofit data for standard shreds.

| | |
|---|---|
| Shred Dimensions | ⅛" thick × ⅛" wide × ¾" long |
| Output | ~9000 lbs/hr |

TABLE 8

VFS retrofit data for long thin shreds.

| | |
|---|---|
| Dimensions of Long Thin Shred | 1/16" thick × ⅛" wide × 1½" long |
| Output | ~5500 lbs/hr |

TABLE 9

VFS retrofit data for long, thin, crescent-shaped shreds.

| | |
|---|---|
| Shred Dimensions | 1/16" thick × ⅛" wide × 1½" long |
| VFS Retrofit Output | ~5500 lbs/hr |

As demonstrated in Tables 7–9, the VFS retrofit is capable of producing approximately 9000 pounds per hour of standard shreds, compared to an upper limit of 1800 pounds per hour with the PAVFM, 3400 pounds per hour with the modified PAVFM, and 3600 pounds per hour with the PAHFS. Further, the VFS retrofit is capable of producing approximately 5500 pounds per hour of long thin shreds and long, thin, crescent-shaped shreds, compared to upper limit of 1200 pounds per hour with any of the prior art machines. Notably, the VFS retrofit requires only two blades to achieve this output, compared to eight blades in the PAHFS and more than 80 blades in the PAVFM.

2. VFS Standalone

Figure 14:
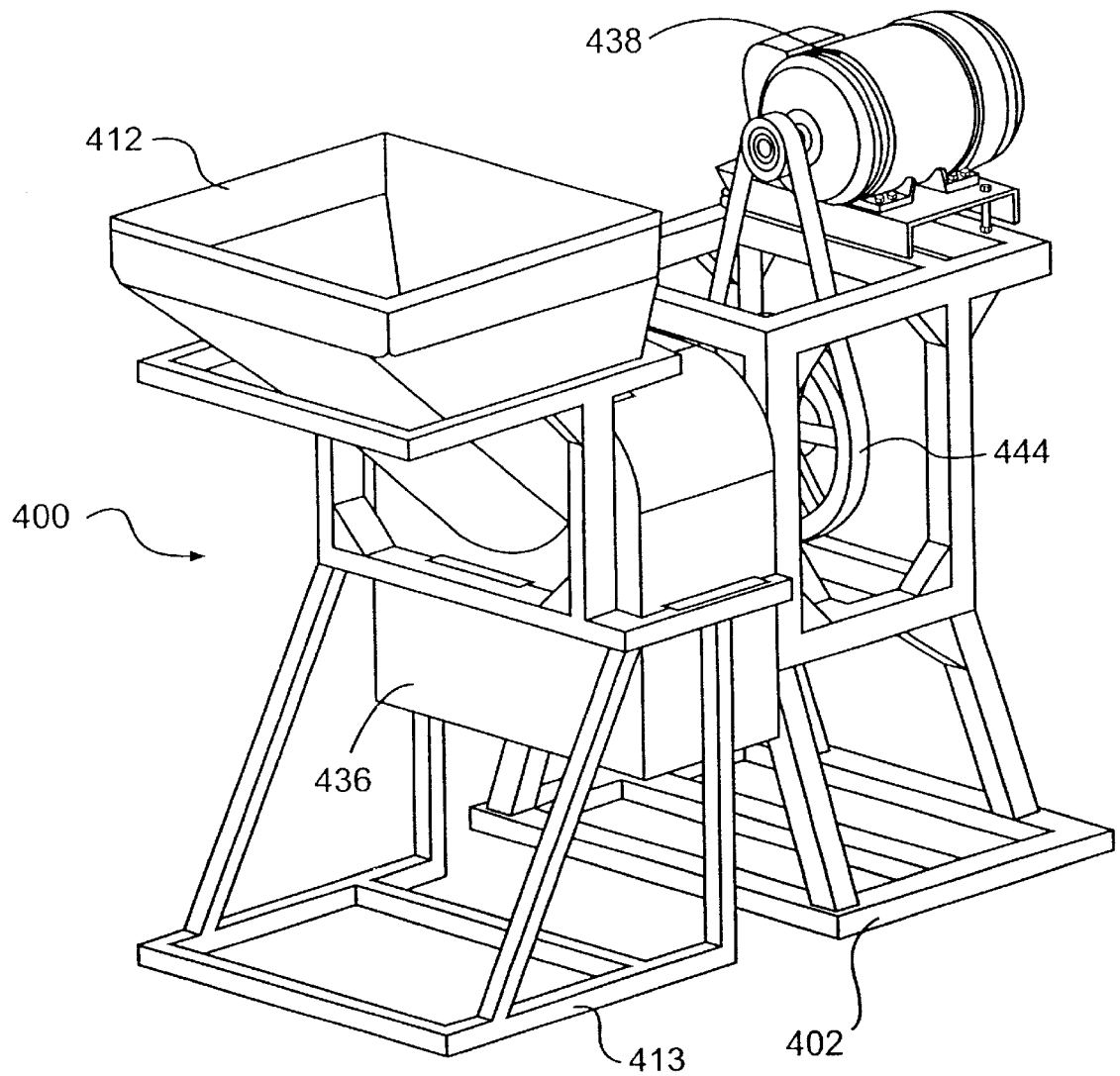
FIG. 14 is a perspective view of an apparatus according to a second embodiment of the present invention.

In another preferred embodiment, the VFS is incorporated in an independent machine, referred to herein as a "VFS standalone." In FIG. 14, the VFS standalone is designated generally by reference numeral 400. The VFS standalone 400 has basically the same structure, and operates in exactly the same way, as the VFS retrofit, except for a few differences described below in connection with FIGS. 14–17.

Figure 15:
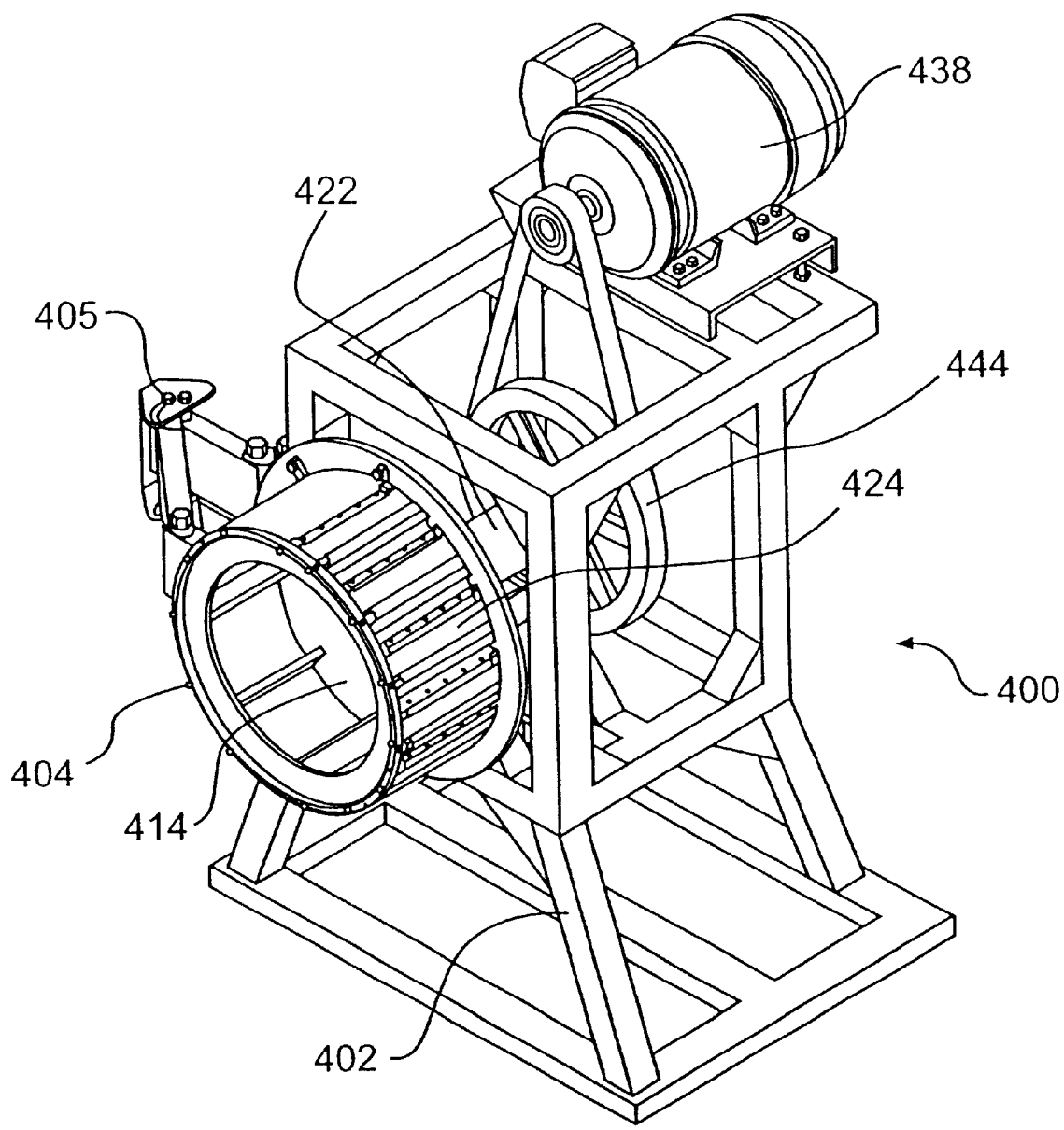
FIG. 15 is a perspective view of the apparatus shown in FIG. 14, without the feed hopper assembly.

Like the VFS retrofit, the VFS standalone includes a frame 402 and a generally cylindrical, vertically-oriented housing 404, shown in FIG. 15. The housing 404 is held in place by a swing arm 405, which in turn is connected to the frame 402. The housing 404 has an internal diameter of approximately 24" and a depth of approximately 10".

Figure 16:
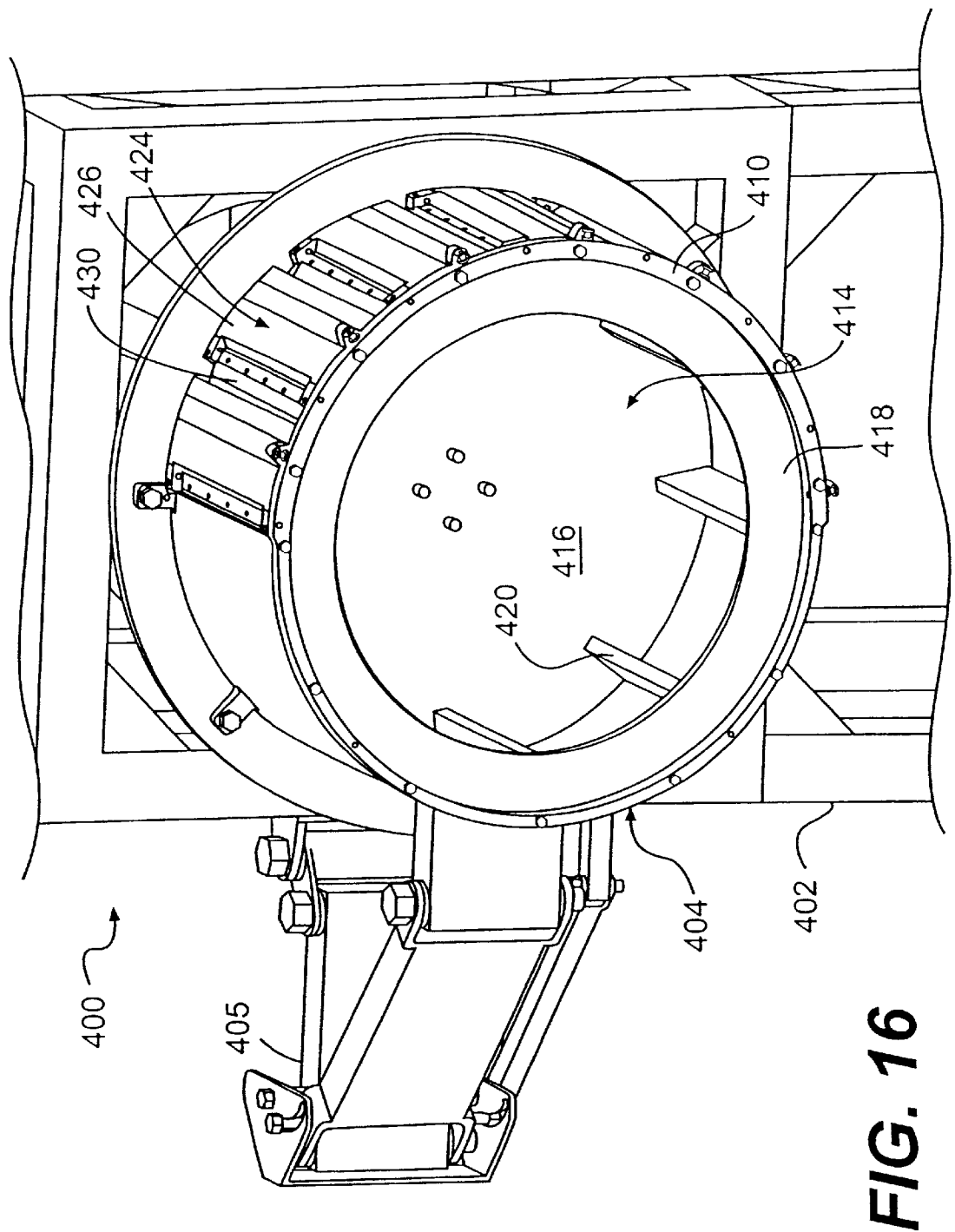
FIG. 16 is an enlarged perspective view of a portion of the apparatus shown in FIG. 15.
Figure 17:
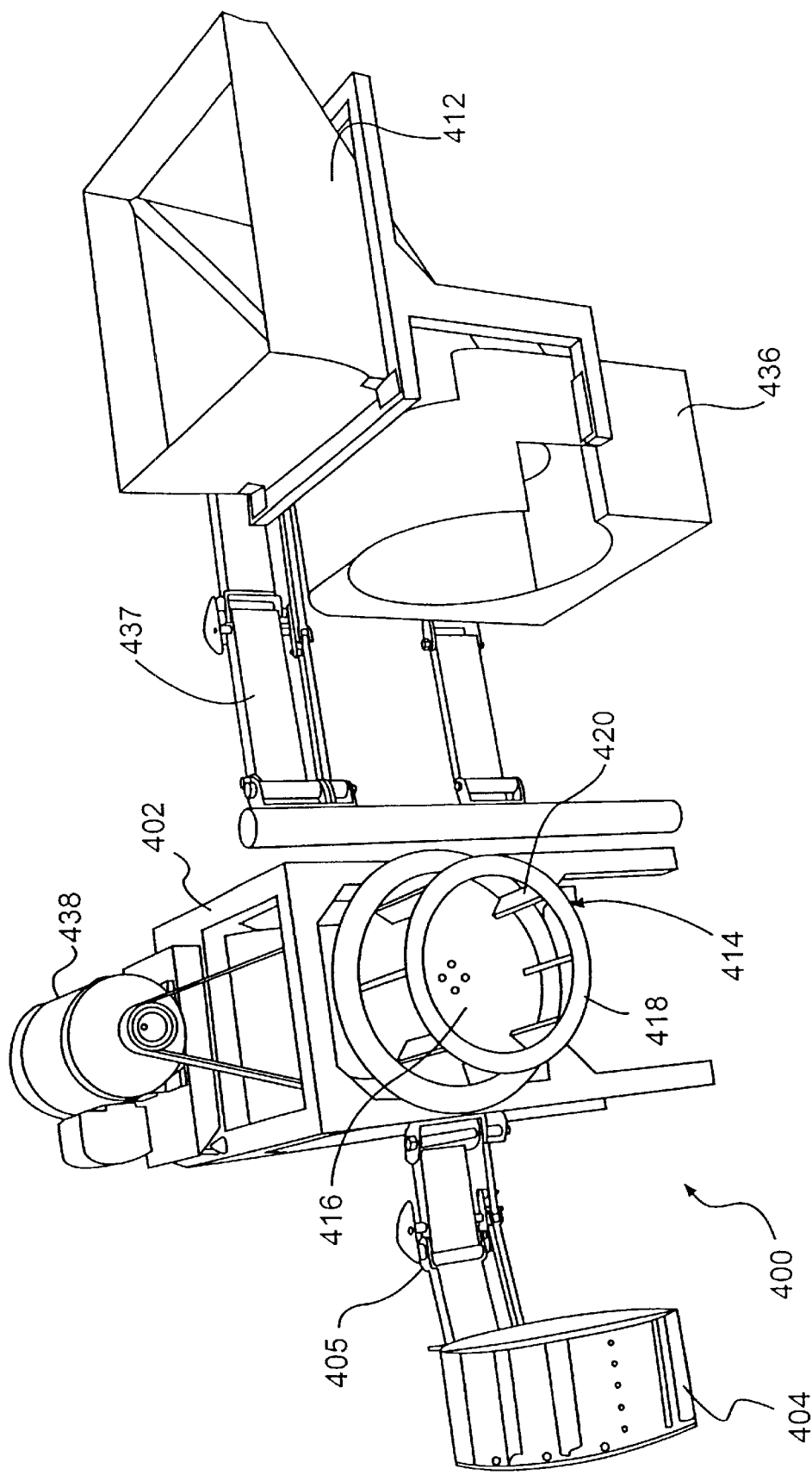
FIG. 17 is a perspective of an apparatus according to a third embodiment of the present invention.

An impeller 414 is rotatably mounted within the housing 404. As shown in FIG. 16, the impeller includes a disc-shaped base plate 416 and an annular front plate 418, with eight circumferentially-spaced paddles 420 fitted therebetween. The impeller base plate 416 is bolted to a drive shaft 422, shown in FIG. 15.

The right half of the housing 404 includes seven feed plates 424. Each feed plate 424 is secured to an annular ring 410 that encircles an open front face of the housing 404. Each feed plate includes a contoured segment 426 and a cutting implement, such as a blade 430, except for the uppermost feed plate, which includes only a segment 426.

As shown in FIG. 14, the VFS standalone further includes a feed hopper 412, which is mounted on a separate frame 413. In that way, the feed hopper frame 413 can be retracted to permit access to the housing 404, such as shown in FIG. 15. The feed hopper frame 413 also supports a discharge chute 436, for directing the cut product to a conveyor (not shown) or the like. In an alternate embodiment shown in FIG. 17, the feed hopper 412 and discharge chute 436 can be mounted on a swing arm 437.

The VFS standalone also includes a variable-frequency, 30 horsepower motor 438, for driving rotation of the impeller 414. The motor 438 is coupled to the impeller drive shaft 422 via a known pulley and gear assembly 444.

Tables 10–12 list VFS standalone production rate data for the three cuts of cheese discussed above with respect to the VFS retrofit. For each type of cut, the input product is a block of mozzarella cheese, approximately 5/8" thick by 5/8" wide, and with a length equal to the desired length of the output product. The cheese is semi-frozen, at a temperature of about 27–30° F. In each example, the impeller rotates at approximately 477 RPM.

TABLE 10

VFS standalone data for standard shreds.

| Shred Dimensions | 1/8" thick × 1/8" wide × 3/4" long |
|---|---|
| Output | >28,000 lbs/hr |

TABLE 11

VFS standalone data for long thin shreds.

| Shred Dimensions | 1/16" thick × 1/8" wide × 1 1/2" long |
|---|---|
| Output | >24,000 lbs/hr |

TABLE 12

VFS standalone data for long, thin, crescent-shaped shreds.

| Shred Dimensions | 1/16" thick × 1/8" wide × 1 1/2" long |
|---|---|
| Output | >18,000 lbs/hr |

As demonstrated in Tables 10–12, output of the VFS standalone is between three to five times greater than the output of the VFS retrofit for each of the three types of shreds. It is expected that a single VFS standalone will be able to do the work between eight and more than a dozen prior art machines, depending on the shred type.

The preferred embodiments discussed above are representative of embodiments of the present invention and are provided for illustrative purposes only. They are not intended to limit the scope of the present invention. Although components, configurations, dimensions, speeds, materials, types of cuts, etc., have been shown and described, such are not limiting. Modifications and variations are contemplated within the scope of the present invention, which is intended to be limited only by the scope of the accompanying claims.

We claim:

1. An apparatus for shredding a product, comprising:
   a housing having an interior bounded by an inner periphery;
   means for feeding a product to be shred to the interior of the housing;
   an impeller rotatably mounted within the housing;
   means for rotating the impeller about a substantially horizontal axis of rotation so as to direct the product along the inner periphery of the housing, in sliding engagement therewith;
   means for cutting a plurality of shreds from a surface of the product facing the inner periphery of the housing; and
   means by which the plurality of shreds are discharged from the housing.

2. The apparatus of claim 1, wherein the cutting means comprises at least one contoured cutting implement.

3. The apparatus of claim 2, wherein the cutting means comprises an even number of contoured cutting implements.

4. The apparatus of claim 3, wherein the inner periphery of the housing comprises a plurality of contoured segments, and each cutting implement is preceded and followed by a respective one of the contoured segments.

5. The apparatus of claim 4, wherein the contours of each cutting implement are the same shape as the contours of the segments preceding and following that cutting implement.

6. The apparatus of claim 5, wherein the contours of each cutting implement are offset relative to the contours of the segment preceding that cutting implement.

7. The apparatus of claim 5, wherein the contours of each cutting implement are aligned with the contours of the segment following that cutting implement.

8. The apparatus of claim 1, wherein the rotating means rotates the impeller about an axis of rotation that is within 30 degrees of horizontal.

9. The apparatus of claim 1, wherein the rotating means comprises a variable-frequency motor.

10. The apparatus of claim 1, wherein the rotating means is operable to rotate the impeller at a high enough speed to cut shreds from the outer faces of blocks of mozzarella cheese.

11. The apparatus of claim 1, wherein the rotating means is operable to rotate the impeller at a high enough speed to cut shreds from the outer faces of blocks of mozzarella cheese that is in either a frozen or a semi-frozen state.

12. An apparatus for shredding a product, comprising:
   a housing having an interior space bounded by a generally cylindrical sidewall that includes at least one contoured segment, the housing further including a contoured cutting implement following the contoured segment, with an opening in the sidewall between the contoured segment and the cutting implement that follows it;
   a feed hopper through which a product to be shred is fed to the interior space of the housing;
   an impeller, including at least one impeller paddle, mounted for rotation within the housing about a substantially horizontal axis of rotation; and
   a driving mechanism coupled to the impeller for rotating the impeller.

13. The apparatus of claim 12, wherein the contours of the cutting implement are different than the contours of the segment that the cutting implement follows.

14. The apparatus of claim 13, wherein the contours of the cutting implement are offset relative to the contours of the segment that the cutting implement follows.

15. The apparatus of claim 14, wherein the housing includes an even number of cutting implements.

16. The apparatus of claim 12, wherein the impeller rotates about an axis of rotation that is within 30 degrees of horizontal.

17. The apparatus of claim 12, wherein the impeller can be rotated at variable speeds.

18. The apparatus of claim 12, wherein the driving mechanism is operable to rotate the impeller at a high enough speed to cut shreds from the outer faces of blocks of mozzarella cheese.

19. The apparatus of claim 12, wherein the driving mechanism is operable to rotate the impeller at a high enough speed to cut shreds from the outer faces of blocks of mozzarella cheese that is in either a frozen or a semi-frozen state.

20. A shredder housing suitable for use in a cutting apparatus, the shredder housing comprising:
   a generally vertically-oriented case having an interior space bounded by a substantially cylindrical peripheral wall that includes (i) at least one corrugated segment in which the corrugations are aligned in a direction that is substantially parallel to the circumference of the cylindrical peripheral wall, and (ii) at least one opening in the wall that is adjacent to such a corrugated segment; and
   a corrugated cutting implement mounted adjacent to the opening in the peripheral wall, across the opening from the corrugated segment, the cutting implement having a cutting edge extending in a direction that is substantially perpendicular to the direction in which the corrugations in the corrugated segment are aligned.

21. The apparatus of claim 20, wherein the corrugations in the cutting implement are different than the corrugations in the segment that precedes it.

22. The apparatus of claim 21, wherein the shredder housing comprises a plurality of openings in the wall, a plurality of corrugated cutting implements, and a plurality of cutting implements, wherein each cutting implement is mounted across a respective opening from a corrugated segment.

23. The apparatus of claim 22, wherein the corrugations in the segment preceding each cutting implement are offset relative to the corrugations in the cutting implement that the segment precedes.

24. An apparatus having interchangeable cutting assemblies, comprising:
   means for supplying a product to be cut to a selected one of a first cutting assembly and a second cutting assembly;
   the first cutting assembly including (i) a housing having an interior where the product is received from the supplying means, the interior being bounded by a substantially smooth inner periphery, (ii) an impeller rotatably mounted within the housing for sliding the product along the inner periphery of the housing as an outer face of the product is held against the inner periphery of the housing by centrifugal force, (iii) means for cutting slices from the outer face of the product as the impeller slides the product along the inner periphery of the housing, and (iv) means by which the slices are discharged from the housing;
   the second cutting assembly being interchangeable with the first cutting assembly and including (i) a housing having an interior where the product is received from the supplying means, the interior being bounded by an inner periphery, (ii) an impeller rotatably mounted within the housing for sliding the product along the inner periphery of the housing as an outer face of the product is held against the inner periphery of the housing by centrifugal force, (iii) means for cutting a plurality of shreds from the outer face of the product as the impeller slides the product around the inner periphery of the housing, and (iv) means by which the plurality of shreds are discharged from the housing; and
   means for rotating the impeller of the selected cutting assembly about a substantially horizontal axis of rotation.

25. The apparatus of claim 24, further comprising:
   auxiliary cutting means, operable in conjunction with the first cutting assembly but not with the second cutting assembly, for cutting the slices after they are discharged from the housing of the first cutting assembly; and
   means for driving the auxiliary cutting means.

26. The apparatus of claim 24, wherein the cutting means of the second cutting assembly comprises at least one contoured cutting implement.

27. The apparatus of claim 24, wherein the cutting means of the second cutting assembly comprises an even number of contoured cutting implements.

28. The apparatus of claim 27, wherein the inner periphery of the housing of the second cutting assembly comprises a plurality of contoured segments, and each cutting implement of the second cutting assembly is preceded and followed by a respective one of the contoured segments.

29. The apparatus of claim 28, wherein the contours of each cutting implement of the second cutting assembly are the same shape as the contours of the segments preceding and following that cutting implement.

30. The apparatus of claim 29, wherein the contours of each cutting implement of the second cutting assembly are offset relative to the contours of the segment preceding that cutting implement.

31. The apparatus of claim 29, wherein the contours of each cutting implement of the second cutting assembly are aligned with the contours of the segment following that cutting implement.

32. The apparatus of claim 24, wherein the rotating means rotates the impeller of the selected cutting assembly about an axis of rotation that is within 30 degrees of horizontal.

33. The apparatus of claim 24, wherein the rotating means rotates the impeller of the selected cutting assembly in one direction when the first cutting assembly is selected, and in an opposite direction when the second cutting assembly is selected.

34. The apparatus of claim 24, wherein the rotating means is operable to rotate the first cutting assembly impeller at a high enough speed to cause blocks of mozzarella cheese slid by the impeller to have shreds cut from their outer faces.

35. The apparatus of claim 24, wherein the rotating means is operable to rotate the first cutting assembly impeller at a high enough speed to cause blocks of mozzarella cheese slid by the impeller, which blocks are in either a frozen or a semifrozen state, to have shreds cut from their outer faces.

36. A method of retrofitting a cutting apparatus with a shredder assembly in order to enable the cutting apparatus to make cuts that it could not otherwise make without the shredder assembly, the method comprising:
   detaching an existing generally vertically-oriented housing and impeller from the cutting apparatus;

installing, in place of the existing housing and impeller, a shredder assembly including (i) a generally vertically-oriented housing having an inner periphery including at least one corrugated segment, (ii) a corrugated cutting implement secured to the inner periphery of the housing across an opening in the inner periphery from the corrugated segment, and (iii) an impeller; and mounting the impeller within the housing and coupling the impeller to a driving mechanism which rotates the impeller within the housing.

37. The method of claim 36, further comprising the step of reversing the direction in which the driving mechanism rotates the impeller.

38. A method of shredding a product, comprising:

feeding a product to be shred to an interior of a housing which has an impeller rotatably mounted therein;

rotating the impeller about a substantially horizontal axis of rotation at a speed sufficient to force the product against an inner periphery of the housing throughout each revolution of the impeller;

directing the product along the inner periphery of the housing with the impeller, in sliding engagement with the inner periphery of the housing;

cutting a plurality of shreds from an outer face of the product as the impeller directs the product along the inner periphery of the housing; and discharging the plurality of shreds from the housing.

39. The method of claim 38, wherein the product is mozzarella cheese.

40. The method of claim 39, wherein the mozzarella cheese is in either a frozen or a semi-frozen state.

* * * * *

UNITED STATES PATENT AND TRADEMARK OFFICE
CERTIFICATE OF CORRECTION

PATENT NO.     : 6,536,691 B2
DATED          : March 25, 2003
INVENTOR(S)    : William C. Prewitt et al.

It is certified that error appears in the above-identified patent and that said Letters Patent is hereby corrected as shown below:

Column 3,
Line 36, "for" should read -- per --.
Line 51, "3" should read -- 3" --.

Column 6,
Line 5, "PAHES" should read -- PAHFS --.
Line 32, "PABFS" should read -- PAHFS --.

Column 10,
Lines 27 and 49, "arrangement" should read -- arrangement of --.
Line 58, "thing" should read -- thin --.

Column 12,
Line 1, "perspective" should read -- perspective view --.

Column 15,
Line 63, "work" should read -- work of --.

Column 18,
Line 60, "semifrozen" should read -- semi-frozen --.

Signed and Sealed this

Fourteenth Day of October, 2003

JAMES E. ROGAN
*Director of the United States Patent and Trademark Office*